US011778625B2

(12) United States Patent
Takeda et al.

(10) Patent No.: US 11,778,625 B2
(45) Date of Patent: Oct. 3, 2023

(54) DOWNLINK CONTROL INFORMATION INDICATION FOR MULTICAST AND UNICAST TRANSMISSIONS

(71) Applicant: QUALCOMM Incorporated, San Diego, CA (US)

(72) Inventors: Kazuki Takeda, Tokyo (JP); Le Liu, Fremont, CA (US); Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/148,410

(22) Filed: Jan. 13, 2021

(65) Prior Publication Data

US 2022/0225384 A1     Jul. 14, 2022

(51) Int. Cl.
*H04W 72/23*     (2023.01)
*H04L 1/00*     (2006.01)
*H04L 12/18*     (2006.01)

(52) U.S. Cl.
CPC ........... *H04W 72/23* (2023.01); *H04L 1/0061* (2013.01); *H04L 12/189* (2013.01)

(58) Field of Classification Search
None
See application file for complete search history.

(56) References Cited

U.S. PATENT DOCUMENTS

| | | | |
|---|---|---|---|
| 2011/0080859 A1 | 4/2011 | Phan et al. | |
| 2020/0221485 A1* | 7/2020 | Cirik | .................. H04L 25/0226 |
| 2021/0329502 A1 | 10/2021 | Peng et al. | |
| 2021/0385832 A1* | 12/2021 | Zhang | .................... H04W 80/02 |
| 2022/0015082 A1* | 1/2022 | Farag | ..................... H04W 72/14 |
| 2022/0124768 A1* | 4/2022 | Frenne | .................. H04L 5/0048 |
| 2023/0147173 A1* | 5/2023 | Matsumura | ............ H04W 72/23 |
| | | | 370/329 |

FOREIGN PATENT DOCUMENTS

| | | | |
|---|---|---|---|
| WO | WO-2020134193 A1 | | 7/2020 |
| WO | WO 2022006849 | * | 1/2022 |
| WO | WO-2022006849 A1 | * | 1/2022 |

OTHER PUBLICATIONS

International Search Report and Written Opinion—PCT/US2021/063057—ISA/EPO—dated Apr. 21, 2022.

* cited by examiner

*Primary Examiner* — Jenkey Van
(74) *Attorney, Agent, or Firm* — Holland & Hart LLP

(57) ABSTRACT

Methods, systems, and devices for wireless communications are described. A user equipment (UE) may be configured with a mapping between downlink control information (DCI) codepoint values, multicast configurations, and unicast configurations. A DCI may then signal to the UE to apply one of a multicast configuration or a unicast configuration to receive a shared data channel transmission. For example, for a given DCI field of a group-common downlink control channel for multicast data, one or some DCI codepoint values may be associated with values configured for a multicast configuration, while remaining codepoints are associated with values configured for a unicast configuration. In some implementations, the UE may identify which multicast configuration or unicast configuration to apply based on the mapping, a type of data transmission scheduled by the DCI, specified values for the DCI codepoint values, whether the shared data channel transmission is a retransmission, or a combination thereof.

30 Claims, 18 Drawing Sheets

DOWNLINK CONTROL INFORMATION INDICATION FOR MULTICAST AND UNICAST TRANSMISSIONS

FIELD OF TECHNOLOGY

The following relates to wireless communications, including downlink control information (DCI) indication for multicast and unicast transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some examples, communications between wireless devices (e.g., between a base station and one or more UEs) can be split into two categories: point-to-point (PTP) communications (e.g., unicast communications) and point-to-multipoint (PTM) communications (e.g., multicast communications, broadcast communications, etc.). Techniques are desired for enabling PTM communications.

SUMMARY

The described techniques relate to improved methods, systems, devices, and apparatuses that support downlink control information (DCI) indication for multicast and unicast transmissions. Generally, the described techniques provide for a user equipment (UE) to receive a codepoint mapping configuration that maps a set of DCI codepoint values (e.g., codepoint indexes) to a set of multicast configurations and maps the set of DCI codepoint values to a set of unicast configurations. Subsequently, the UE may receive a DCI (e.g., control message) that signals to the UE to apply one of a multicast configuration or a unicast configuration to then receive a shared data channel transmission based on the codepoint mapping configuration. In some examples, the UE may identify which multicast configuration or unicast configuration to apply for receiving the shared data channel transmission based on a type of data transmission scheduled by the DCI (e.g., a multicast data transmission or a non-multicast data transmission), indicated values for the set of DCI codepoint values (e.g., a "unicast value" or a "null value" or a "no value"), whether the shared data channel transmission is a retransmission, or a combination thereof.

A method for wireless communications at a first UE is described. The method may include receiving a codepoint configuration for a point to multipoint (PTM) transmission scheme that indicates a mapping between a set of multiple codepoint indexes, a set of multiple multicast configurations, and a set of multiple unicast configurations; receiving a control message that schedules a shared data channel transmission for at least one UE of a UE group including a set of multiple UEs including the first UE, the control message including a first codepoint index of the set of multiple codepoint indexes; identifying a transmission configuration that is one of a first multicast configuration of the set of multiple multicast configurations or a first unicast configuration of the set of multiple unicast configurations to apply for receiving the shared data channel transmission based on the mapping and the first codepoint index; and receiving the shared data channel transmission in accordance with the identified transmission configuration.

An apparatus for wireless communications at a first UE is described. The apparatus may include a processor, memory in electronic communication with the processor, and instructions stored in the memory. The instructions may be executable by the processor to cause the apparatus to receive a codepoint configuration for a PTM transmission scheme that indicates a mapping between a set of multiple codepoint indexes, a set of multiple multicast configurations, and a set of multiple unicast configurations; to receive a control message that schedules a shared data channel transmission for at least one UE of a UE group including a set of multiple UEs including the first UE, the control message including a first codepoint index of the set of multiple codepoint indexes; to identify a transmission configuration that is one of a first multicast configuration of the set of multiple multicast configurations or a first unicast configuration of the set of multiple unicast configurations to apply for receiving the shared data channel transmission based on the mapping and the first codepoint index; and to receive the shared data channel transmission in accordance with the identified transmission configuration.

Another apparatus for wireless communications at a first UE is described. The apparatus may include means for receiving a codepoint configuration for a PTM transmission scheme that indicates a mapping between a set of multiple codepoint indexes, a set of multiple multicast configurations, and a set of multiple unicast configurations; means for receiving a control message that schedules a shared data channel transmission for at least one UE of a UE group including a set of multiple UEs including the first UE, the control message including a first codepoint index of the set of multiple codepoint indexes; means for identifying a transmission configuration that is one of a first multicast configuration of the set of multiple multicast configurations or a first unicast configuration of the set of multiple unicast configurations to apply for receiving the shared data channel transmission based on the mapping and the first codepoint index; and means for receiving the shared data channel transmission in accordance with the identified transmission configuration.

A non-transitory computer-readable medium storing code for wireless communications at a first UE is described. The code may include instructions executable by a processor to receive a codepoint configuration for a PTM transmission scheme that indicates a mapping between a set of multiple codepoint indexes, a set of multiple multicast configurations, and a set of multiple unicast configurations; to receive a control message that schedules a shared data channel transmission for at least one UE of a UE group including a set of multiple UEs including the first UE, the control message including a first codepoint index of the set of multiple codepoint indexes; to identify a transmission configuration that is one of a first multicast configuration of the set of multiple multicast configurations or a first unicast configuration of the set of multiple unicast configurations to apply for receiving the shared data channel transmission based on the mapping and the first codepoint index; and to receive the shared data channel transmission in accordance with the identified transmission configuration.

In some examples of the method, apparatuses, and non-transitory computer-readable medium described herein, receiving the codepoint configuration may include operations, features, means, or instructions for receiving a first codepoint mapping configuration that maps a first subset of the set of multiple codepoint indexes to the set of multiple multicast configurations and receiving a second codepoint mapping configuration that maps each of the set of multiple codepoint indexes to a respective unicast configuration of the set of multiple unicast configurations.

In some examples of the method, apparatuses, and non-transitory computer-readable medium described herein, identifying the transmission configuration may include operations, features, means, or instructions for identifying that the transmission configuration may be the first multicast configuration based on the first codepoint index occurring within the first subset of the set of multiple codepoint indexes.

In some examples of the method, apparatuses, and non-transitory computer-readable medium described herein, identifying the transmission configuration may include operations, features, means, or instructions for identifying that the transmission configuration may be the first unicast configuration based on the first codepoint index occurring outside of the first subset of the set of multiple codepoint indexes.

In some examples of the method, apparatuses, and non-transitory computer-readable medium described herein, receiving the shared data channel transmission may include operations, features, means, or instructions for receiving the shared data channel transmission in accordance with a parameter indicated by the identified transmission configuration.

In some examples of the method, apparatuses, and non-transitory computer-readable medium described herein, the parameter includes a transmission configuration indicator (TCI) state, a resource allocation, a modulation and coding scheme (MCS), a precoding matrix indicator (PMI), or any combination thereof.

In some examples of the method, apparatuses, and non-transitory computer-readable medium described herein, receiving the control message may include operations, features, means, or instructions for receiving the control message including the first codepoint index in a field having a bit width that may be determined based on a first number of codepoint indexes of the set of multiple codepoint indexes that correspond to the set of multiple multicast configurations, a second number of codepoint indexes of the set of multiple codepoint indexes that correspond to the set of multiple unicast configurations, or both.

In some examples of the method, apparatuses, and non-transitory computer-readable medium described herein, receiving the control message may include operations, features, means, or instructions for receiving the control message including the first codepoint index in a field having a bit width that may be determined based on the mapping indicating an association between a respective codepoint index of the set of multiple codepoint indexes and a respective index value of a set of multiple index values.

In some examples of the method, apparatuses, and non-transitory computer-readable medium described herein, receiving the codepoint configuration may include operations, features, means, or instructions for receiving the codepoint configuration that indicates the association.

In some examples of the method, apparatuses, and non-transitory computer-readable medium described herein, the association may be determined based on an ascending order or a descending order of parameters indicated in the codepoint configuration.

In some examples of the method, apparatuses, and non-transitory computer-readable medium described herein, the association may be determined based on an ascending order or a descending order of identifiers (IDs) of one or more parameters indicated in the codepoint configuration.

In some examples of the method, apparatuses, and non-transitory computer-readable medium described herein, receiving the codepoint configuration may include operations, features, means, or instructions for receiving the codepoint configuration indicating a unicast value corresponding to a second codepoint index value of the set of multiple codepoint indexes and a null value corresponding to a third codepoint index value of the set of multiple codepoint indexes.

Some examples of the method, apparatuses, and non-transitory computer-readable medium described herein may further include operations, features, means, or instructions for receiving a second control message that schedules a second shared data channel transmission for the UE group and determining to refrain from receiving the second shared data channel transmission or from transmitting acknowledgment feedback for the second shared data channel transmission based on a second codepoint index included in the second control message having the third codepoint index value.

Some examples of the method, apparatuses, and non-transitory computer-readable medium described herein may further include operations, features, means, or instructions for receiving an indication of a subgroup of the UE group to which the first UE belongs, where the identifying which of the first multicast configuration or the first unicast configuration to apply may be based on the first UE being in the subgroup.

In some examples of the method, apparatuses, and non-transitory computer-readable medium described herein, receiving the control message may include operations, features, means, or instructions for receiving a new data indicator (NDI) field in the control message, where the identifying which of the first multicast configuration or the first unicast configuration to apply may be based on a value of the NDI field.

In some examples of the method, apparatuses, and non-transitory computer-readable medium described herein, receiving the control message may include operations, features, means, or instructions for receiving a group-common control message with a cyclic redundancy check (CRC) scrambled by a group-common radio network temporary identifier (RNTI) corresponding to the UE group, the group-common control message scheduling a group-common shared data channel transmission that may be scrambled with the group-common RNTI, where the control message includes the group-common control message and the shared data channel transmission includes the group-common shared data channel transmission.

A method for wireless communications at a base station is described. The method may include transmitting a codepoint configuration for a PTM transmission scheme that indicates a mapping between a set of multiple codepoint indexes, a set of multiple multicast configurations, and a set of multiple unicast configurations, transmitting a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations, and transmitting the shared data channel transmission in accordance with the indicated transmission configuration.

An apparatus for wireless communications at a base station is described. The apparatus may include a processor, memory in electronic communication with the processor, and instructions stored in the memory. The instructions may be executable by the processor to cause the apparatus to transmit a codepoint configuration for a PTM transmission scheme that indicates a mapping between a set of multiple codepoint indexes, a set of multiple multicast configurations, and a set of multiple unicast configurations, transmit a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations, and transmit the shared data channel transmission in accordance with the indicated transmission configuration.

Another apparatus for wireless communications at a base station is described. The apparatus may include means for transmitting a codepoint configuration for a PTM transmission scheme that indicates a mapping between a set of multiple codepoint indexes, a set of multiple multicast configurations, and a set of multiple unicast configurations, means for transmitting a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations, and means for transmitting the shared data channel transmission in accordance with the indicated transmission configuration.

A non-transitory computer-readable medium storing code for wireless communications at a base station is described. The code may include instructions executable by a processor to transmit a codepoint configuration for a PTM transmission scheme that indicates a mapping between a set of multiple codepoint indexes, a set of multiple multicast configurations, and a set of multiple unicast configurations, transmit a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations, and transmit the shared data channel transmission in accordance with the indicated transmission configuration.

In some examples of the method, apparatuses, and non-transitory computer-readable medium described herein, transmitting the codepoint configuration may include operations, features, means, or instructions for transmitting a first codepoint mapping configuration that maps a first subset of the set of multiple codepoint indexes to the set of multiple multicast configurations and transmitting a second codepoint mapping configuration that maps each of the set of multiple codepoint indexes to a respective unicast configuration of the set of multiple unicast configurations.

In some examples of the method, apparatuses, and non-transitory computer-readable medium described herein, transmitting the control message may include operations, features, means, or instructions for transmitting the control message including the first codepoint index to indicate the transmission configuration may be the first multicast configuration based on the first codepoint index occurring within the first subset of the set of multiple codepoint indexes.

In some examples of the method, apparatuses, and non-transitory computer-readable medium described herein, transmitting the control message may include operations, features, means, or instructions for transmitting the control message including the first codepoint index to indicate the transmission configuration may be the first unicast configuration based on the first codepoint index occurring outside of the first subset of the set of multiple codepoint indexes.

In some examples of the method, apparatuses, and non-transitory computer-readable medium described herein, transmitting the shared data channel transmission may include operations, features, means, or instructions for transmitting the shared data channel transmission in accordance with a parameter indicated by the transmission configuration.

In some examples of the method, apparatuses, and non-transitory computer-readable medium described herein, the parameter includes a TCI state, a resource allocation, an MCS, a PMI, or any combination thereof.

In some examples of the method, apparatuses, and non-transitory computer-readable medium described herein, transmitting the control message may include operations, features, means, or instructions for transmitting the control message including the first codepoint index in a field having a bit width that may be determined based on a first number of codepoint indexes of the set of multiple codepoint indexes that correspond to the set of multiple multicast configurations, a second number of codepoint indexes of the set of multiple codepoint indexes that correspond to the set of multiple unicast configurations, or both.

In some examples of the method, apparatuses, and non-transitory computer-readable medium described herein, transmitting the control message may include operations, features, means, or instructions for transmitting the control message including the first codepoint index in a field having a bit width that may be determined based on the mapping indicating an association between a respective codepoint index of the set of multiple codepoint indexes and a respective index value of a set of multiple index values.

In some examples of the method, apparatuses, and non-transitory computer-readable medium described herein, transmitting the codepoint configuration may include operations, features, means, or instructions for transmitting the codepoint configuration that indicates the association.

In some examples of the method, apparatuses, and non-transitory computer-readable medium described herein, the association may be determined based on an ascending order or a descending order of parameters indicated in the codepoint configuration.

In some examples of the method, apparatuses, and non-transitory computer-readable medium described herein, the association may be determined based on an ascending order or a descending order of IDs of one or more parameters indicated in the codepoint configuration.

In some examples of the method, apparatuses, and non-transitory computer-readable medium described herein, transmitting the codepoint configuration may include operations, features, means, or instructions for transmitting the codepoint configuration indicating a unicast value corresponding to a second codepoint index value of the set of multiple codepoint indexes and a null value corresponding to a third codepoint index value of the set of multiple codepoint indexes.

DETAILED DESCRIPTION

Figure 1:
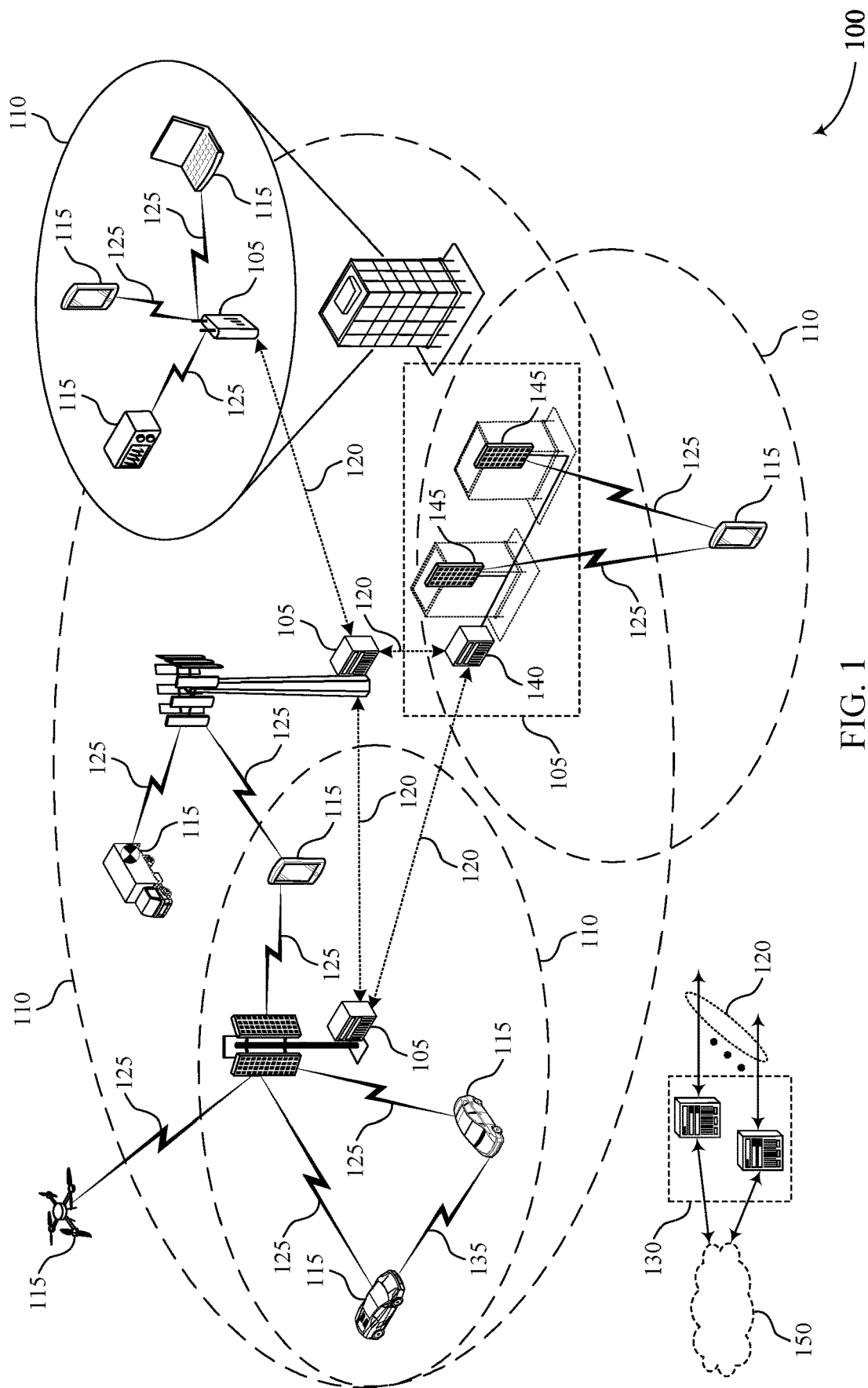
FIG. 1 illustrates an example of a wireless communications system that supports downlink control information (DCI) indication for multicast and unicast transmissions in accordance with aspects of the present disclosure.

In some examples, communications between wireless devices (e.g., between a base station and one or more user equipments (UEs)) can be split into two categories: point-to-point (PTP) communications (e.g., unicast communications) and point-to-multipoint (PTM) communications (e.g., multicast communications, broadcast communications, etc.). For PTM communications (e.g., a PTM transmission scheme 1) and for connected UEs in a same multicast/broadcast services (MBS) group, a base station may use a group-common downlink control channel with a cyclic redundancy check (CRC) scrambled by a group-common radio network temporary identifier (RNTI) to schedule a group-common downlink shared channel which is scrambled with the same group-common RNTI. This scheme may be called a group-common downlink control channel-based group scheduling scheme.

Additionally, the UEs receiving these PTM communications may support transmitting acknowledgment feedback to indicate whether the PTM communications (e.g., multicast messages) were successfully received or not. In some cases, the PTM communications may be transmitted using broader (e.g., non-UE-specific) beams so that all UEs in the MBS group can receive the multicast data. However, if at least one UE transmits a negative acknowledgment (NACK) message, the base station may retransmit the multicast data using broader beams as well (e.g., a same broad beam or a different broad beam that is received by all UEs in the MBS group), such that UEs that successfully received and decoded the multicast data in the initial transmission may receive and decode the same multicast data again, thereby wasting processing power and battery life by receiving and decoding the same information more than once.

As described herein, a UE may be configured (e.g., by a base station) with a mapping between downlink control information (DCI) codepoint values and multicast configurations and a mapping between the DCI codepoint values and unicast configurations. The base station may then use a DCI to signal to the UE to apply one of a multicast configuration or a unicast configuration to receive a subsequent data transmission. For example, for a given DCI field of a group-common downlink control channel for multicast data, one or some DCI codepoint values may be associated with values configured for a multicast reception configuration, while remaining codepoints are associated with values configured for a unicast reception configuration.

Additionally or alternatively, for a codepoint of the DCI field that has no value in the multicast configurations, the UE may be configured with a "unicast value" or "no value" (e.g., a null value), where if the DCI field indicates the "no value," the UE may not receive the multicast data scheduled by the group-common downlink control channel or the UE may not transmit acknowledgment feedback for the multicast data scheduled by the group-common downlink control channel. Additionally or alternatively, for a retransmission of a multicast data, one or some DCI fields may be interpreted as if the retransmission is unicast. For example, for a DCI format that schedules a retransmission of a multicast data, the DCI codepoints may be interpreted based on the non-multicast configurations. In some examples, a new data indicator (NDI) field in the group-common downlink control channel may indicate whether the scheduled multicast data is a retransmission or not.

Aspects of the disclosure are initially described in the context of wireless communications systems. Additionally, aspects of the disclosure are illustrated through an additional wireless communications system, an indication scheme, and a process flow. Aspects of the disclosure are further illustrated by and described with reference to apparatus diagrams, system diagrams, and flowcharts that relate to DCI indication for multicast and unicast transmissions.

FIG. 1 illustrates an example of a wireless communications system 100 that supports a DCI indication for multicast and unicast transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, communications between wireless devices (e.g., between a base station and one or more UEs) can be split into two categories: PTP communications (e.g., unicast communications) and PTM communications (e.g., multicast communications, broadcast communications, etc.). For example, for PTP communications and for UEs 115 in a connected state (e.g., RRC CONNECTED UEs), a UE-specific downlink control channel (e.g., a physical downlink control channel (PDCCH)) with a CRC scrambled by a UE-specific RNTI (e.g., a cell RNTI (C-RNTI)) may be used to schedule a UE-specific downlink shared channel (e.g., a physical downlink shared channel (PDSCH)) which is scrambled with the same UE-specific RNTI. Additionally or alternatively, for a first type of PTM communications (e.g., a PTM transmission scheme 1) and for UEs 115 in a same MBS group that are in a connected state (e.g., RRC CONNECTED UEs), a group-common downlink control channel (e.g., PDCCH) with a CRC scrambled by a group-common RNTI may be used to schedule a group-common downlink shared channel (e.g., PDSCH) which is scrambled with the same group-common RNTI. This first type of PTM communications may be referred to as a group-common PDCCH-based group scheduling scheme. Additionally or alternatively, for a second type of PTM communications (e.g., a PTM transmission scheme 2) and for UEs 115 in a same MBS group that are in a connected state (e.g., RRC CONNECTED UEs), a UE-specific downlink control channel (e.g., PDCCH) with a CRC scrambled by a UE-specific RNTI (e.g., C-RNTI) may be used to schedule a group-common PDSCH which is scrambled with group-common RNTI. This a second type of PTM communications may be referred to as a UE-specific PDCCH-based group scheduling scheme.

For the PTP and PTM communication schemes described, the "UE-specific" downlink control channels (e.g., UE-specific PDCCHs) and the "UE-specific" downlink shared channels (e.g., UE-specific PDSCHs) may represent downlink control channels or downlink shared channels that can be identified by a target UE 115 (e.g., specific UE 115) alone and cannot be identified by the other UEs 115 in the same MBS group with the target UE 115. Additionally, the "group-common" downlink control channels (e.g., group-common PDCCHs) and the "group-common" downlink shared channels (e.g., group-common PDSCHs) may represent downlink control channels or downlink shared channels that are transmitted in same time and frequency resources and can be identified by all UEs 115 in the same MBS group. In some cases, for UEs 115 in a connected state (e.g., RRC CONNECTED UEs), if an initial transmission for a multicast message (e.g., multicast data) is based on the first type of PTM communications (e.g., PTM transmission scheme 1), the UEs 115 may at least support receiving one or more retransmissions using the first type of PTM communications as well.

Additionally, for UEs 115 in a connected state (e.g., RRC CONNECTED UEs) receiving multicast messages, at least for the first type of PTM communications, the UEs 115 may support acknowledgment/negative acknowledgment (ACK/NACK) based HARQ-ACK feedback for multicast data, NACK-only based HARQ-ACK feedback for multicast data, or both. For the ACK/NACK based HARQ-ACK feedback for multicast data and from a per-UE perspective, a UE 115 may feedback an ACK or a NACK for the multicast data. Additionally or alternatively, for the ACK/NACK based HARQ-ACK feedback for multicast data and from UEs 115 within a group perspective (e.g., UEs 115 in a same MBS group), a given UE 115 within the group may use a physical uplink control channel (PUCCH) resource configuration for the ACK/NACK feedback (e.g., shared or separate PUCCH resources). For the NACK-only based HARQ-ACK feedback for multicast data and from a per-UE perspective, a UE 115 may transmit a NACK if the multicast data is unsuccessfully received and may not transmit any feedback if the multicast data is successfully received. Additionally or alternatively, for the NACK-only based HARQ-ACK feedback for multicast data and from UEs 115 within a group perspective, a given UE 115 within the group may use a PUCCH resource configuration for NACK-only feedback. If both the ACK/NACK based HARQ-ACK feedback and the NACK-only based HARQ-ACK feedback are supported, a UE 115 may use either feedback scheme (e.g., UE implementation) or may be indicated which feedback scheme to use.

In some examples, a multicast PDSCH (e.g., carrying multicast data) may be transmitted using a broader (e.g., non-UE-specific) beam so that any UE 115 that wants to receive the multicast PDSCH (e.g., UEs 115 in a same MBS group) can receive the multicast PDSCH. If a HARQ-ACK feedback scheme (e.g., the ACK/NACK based HARQ-ACK feedback or the NACK-only based HARQ-ACK feedback) for multicast data is supported and if at least one UE 115 (e.g., not all UEs 115) transmits a NACK, the network (e.g., a base station 105 or another network device) may retransmit the same multicast data. In some cases, for retransmissions of multicast data, an optimal resource allocation, modulation and coding scheme (MCS), precoding (e.g., as indicated by a precoding matrix indicator (PMI)), transmit beam (e.g., as indicated by a transmission configuration indicator (TCI)-state), or a combination thereof for the UEs 115 requiring retransmission may exist.

If a retransmission of multicast data can be sent using the second type of PTM communications as described previously (e.g., PTM transmission scheme 2, UE-specific PDCCH-based group scheduling scheme, etc.), a UE-specific DCI may be used to indicate a UE-specific resource allocation, MCS, precoding, TCI state, or a combination thereof for a given UE 115. However, if an initial transmission and retransmissions of a same multicast data are constrained to being transmitted using the first type of PTM communications as described previously (e.g., PTM transmission scheme 1, group-common PDCCH-based group scheduling scheme, etc.), it is not clear how the retransmissions of the multicast data can be sent efficiently without causing unnecessary processing burdens on UEs 115 that successfully received and decoded the multicast data previously.

For example, since multicast PDSCHs may be transmitted using the broader beams and the first type of PTM communications uses group-common parameters (e.g., group-common RNTIs) for scheduling multicast data transmissions, when retransmitting the multicast data, a base station 105 may retransmit the multicast data such that all UEs 115 within a same group (e.g., MBS group) receive the retransmission (e.g., based on the broader beam and group-common parameters). Subsequently, each of the UEs 115 in the group may then at least partially decode the retransmission to identify that the retransmission is a retransmission of previously sent multicast data. For any UE 115 that unsuccessfully received the multicast data previously, those UEs 115 may then decode the rest of the retransmission to receive the multicast data. However, any UE 115 that previously received and decoded the multicast data successfully may decode the retransmission to determine the retransmission contains data already successfully received, thereby wasting processing power and battery life of those UEs 115.

Wireless communications system 100 may support efficient techniques for indicating a multicast configuration or a unicast configuration to apply for transmitting a shared data channel transmission (e.g., multicast data, multicast PDSCH, unicast PDSCH, etc.). For example, a UE 115 may be configured (e.g., by a base station 105) with a mapping between DCI codepoint values and multicast configurations and a mapping between the DCI codepoint values and unicast configurations. The base station 105 may then use a DCI to signal to the UE 115 to apply one of a multicast configuration or a unicast configuration to receive a subsequent shared data channel transmission (e.g., multicast PDSCH). For example, for a given DCI field of a group-common downlink control channel for multicast data, one or some DCI codepoint values may be associated with values configured for a multicast reception configuration, while remaining codepoints are associated with values configured for a unicast reception configuration. In some implementations, the UE may identify which multicast configuration or unicast configuration to apply for receiving the shared data channel transmission based on a type of data transmission scheduled by the DCI (e.g., a multicast data transmission or a non-multicast data transmission) and the mapping, indicated values for the set of DCI codepoint values (e.g., a "unicast value" or a "null value" or a "no value"), whether the shared data channel transmission is a retransmission (e.g., as indicated by an NDI field), or a combination thereof.

Figure 2A:
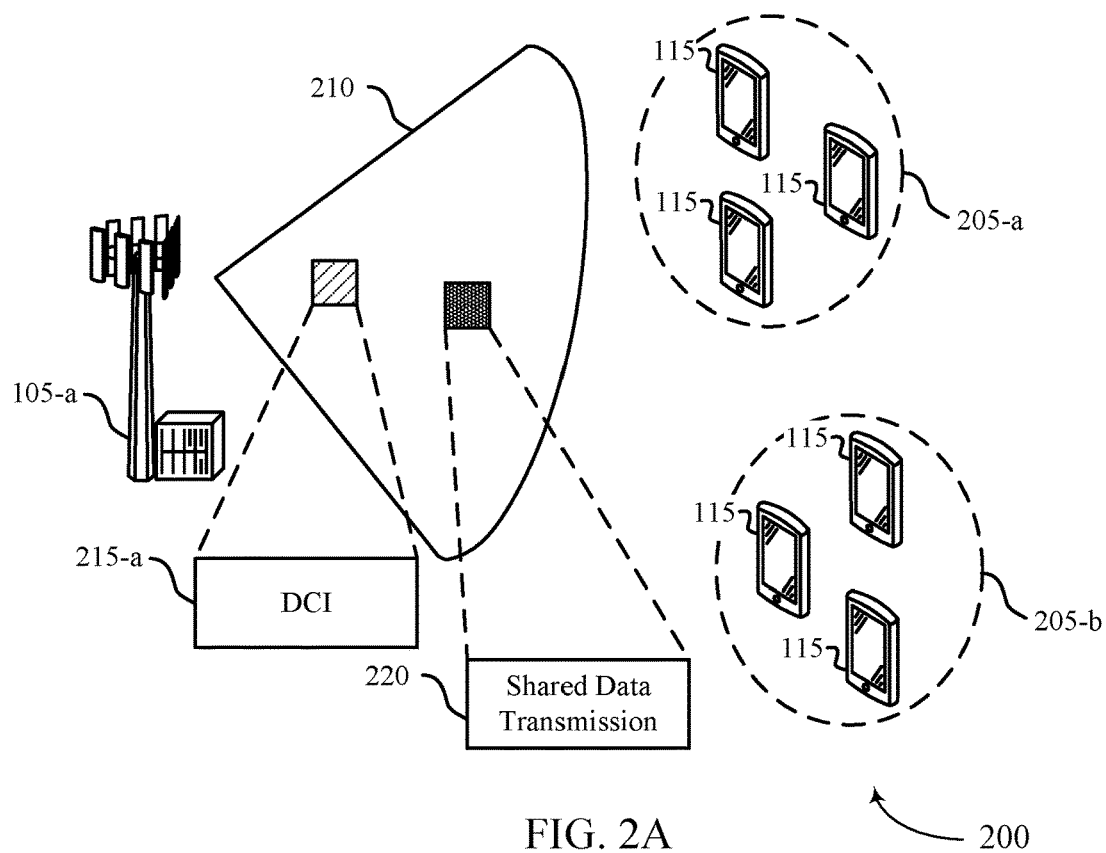
FIGS. 2A and 2B illustrate examples of wireless communications systems that support indications for multicast and unicast transmissions in accordance with aspects of the present disclosure.
Figure 2B:
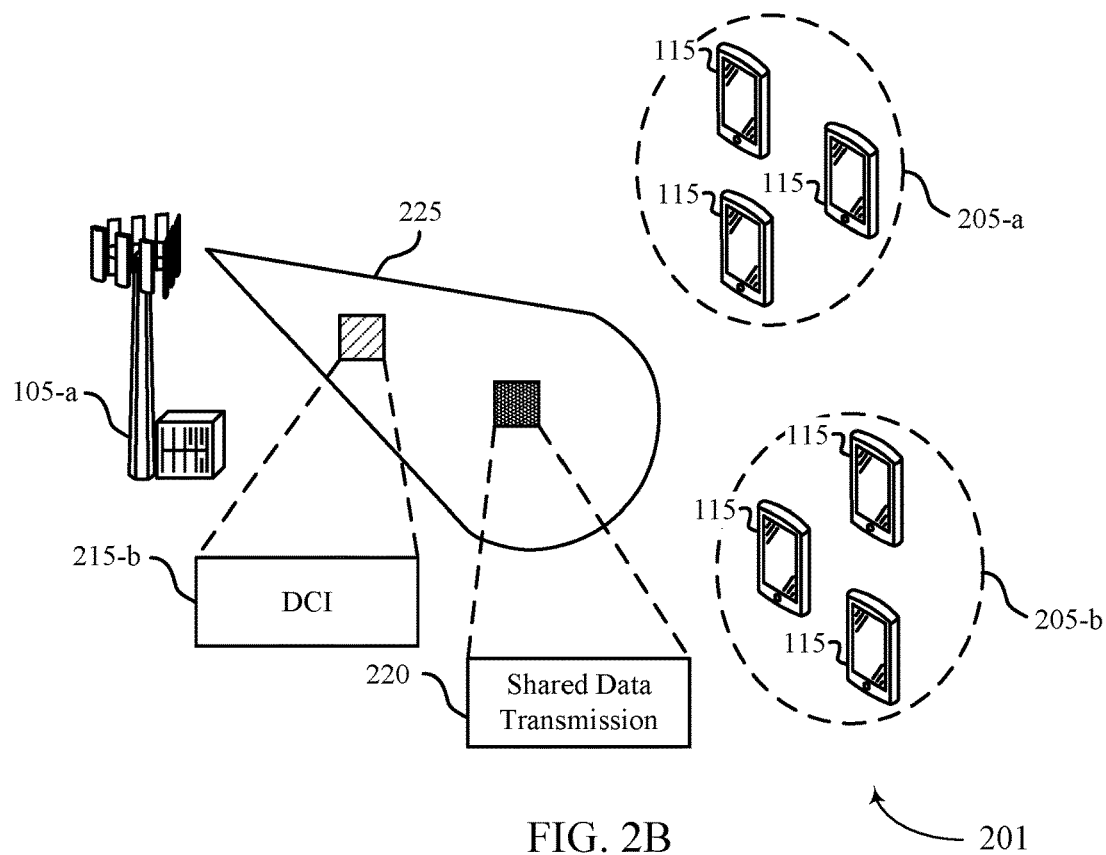

FIGS. 2A and 2B illustrate examples of a wireless communications system 200 and a wireless communications system 201 that support indications for multicast and unicast transmissions in accordance with aspects of the present disclosure. Wireless communications system 200 and wireless communications system 201 may implement aspects of or may be implemented by aspects of wireless communications system 100. For example, wireless communications system 200 and wireless communications system 201 may include a base station 105-*a* and one or more UEs 115, which may represent examples of base stations 105 and UEs 115, respectively, as described with reference to FIG. 1.

In some examples, the one or more UEs 115 may be part of a same group (e.g., an MBS group) that receives same multicast or broadcast data from base station 105-*a*. For example, base station 105-*a* may transmit multicast data to the one or more UEs 115 using a type of PTM communications as described previously. Additionally, the one or more UEs 115 may be grouped into separate subgroups 205 (e.g., based on which UEs 115 are close in proximity to each other or based on which UEs 115 have similar transmission parameters), such as a first subgroup 205-*a* and a second subgroup 205-*b*.

As described herein and in the example of FIGS. 2A and 2B, both an initial transmission and any subsequent retransmissions for a multicast PDSCH (e.g., shared data channel transmission, multicast data transmission, etc.) may be sent using the first type of PTM communications as described previously (e.g., PTM transmission scheme 1). That is, base station 105-*a* may transmit a DCI 215 (e.g., DCI format) for scheduling a shared data transmission 220 (e.g., multicast PDSCH) using a group-common RNTI and is not UE-specific. For example, the techniques described herein may enable a group-common downlink control channel (e.g., group-common PDCCH) with a CRC scrambled by a group-common RNTI to schedule a group-common downlink shared channel (e.g., group-common PDSCH, shared data transmission 220, multicast PDSCH, multicast data, etc.) which is scrambled with the same group-common RNTI. In some examples, the group-common downlink control channel may include a parameter for a unicast downlink shared channel (e.g., unicast PDSCH) for transmitting data (e.g., multicast data) that would be carried in the group-common downlink shared channel. For example, the parameter for the unicast downlink shared channel may include a resource allocation, an MCS, precoding, or a TCI state specific to a UE 115 (e.g., or a subset of UEs 115 in the same MBS group). The unicast downlink shared channel used herein may represent a downlink shared channel scheduled or configured with a C-RNTI, a configured scheduling RNTI (CS-RNTI), or an MCS-C-RNTI.

In some implementations, one or more UEs 115 of the group that receives same multicast or broadcast data from base station 105-a may be configured with multicast configurations and non-multicast configurations (e.g., unicast configurations). The multicast configurations may represent configurations for multicast PDSCHs (e.g., scheduled or configured with a group-common RNTI), and the non-multicast configurations may represent configurations for non-multicast PDSCHs (e.g., scheduled or configured with a C-RNTI, a CS-RNTI, an MCS-C-RNTI, etc.). Additionally, base station 105-a may provide the multicast configurations via RRC signaling to the one or more UEs 115 as part of a multicast PDSCH configuration and may also provide the unicast configurations by RRC signaling to the one or more UEs 115 as part of unicast PDSCH configuration.

When receiving the multicast configurations and the unicast configurations, the one or more UEs 115 may also receive or determine a mapping between different codepoint values (e.g., codepoint indexes) and each of the multicast configurations and each of the unicast configurations. In some examples, the codepoint values may be DCI field codepoints, DCI codepoint indexes, or other DCI values. Table 1 illustrates an example of a mapping between the different codepoint values and each of the multicast configurations and each of the unicast configurations.

TABLE 1

Example Codepoint Mapping Configuration

| DCI Field Codepoint | Multicast Configuration | Non-Multicast Configuration |
| --- | --- | --- |
| 00 | Value 1 | Value 1 |
| 01 | Value 2 | Value 2 |
| 10 | — | Value 3 |
| 11 | — | Value 4 |

As is shown in Table 1, for a given DCI field of a group-common PDCCH for a multicast PDSCH, one or some codepoints may be associated with values configured for multicast PDSCH reception, while remaining codepoints may be associated with values configured for unicast PDSCH reception. For a DCI format that schedules a non-multicast PDSCH, a UE 115 may interpret the DCI codepoints based on the values for the non-multicast configuration (e.g., Values 1, 2, 3, or 4 for the non-multicast configurations). Alternatively, for a DCI format that schedules a multicast PDSCH, a UE 115 may interpret the DCI fields as either indicating a multicast configuration or a non-multicast configuration based on the DCI codepoints. For example, using Table 1 as an example and for a DCI format that schedules a multicast PDSCH, a UE 115 may interpret '00' and '01' as indicating a multicast configuration for the scheduled multicast PDSCH and may interpret '10' and '11' as indicating a non-multicast configuration for the scheduled multicast PDSCH. Each value may correspond to a different configuration for transmitting the scheduled multicast PDSCH, such as respective resource allocations, MCSs, precoding (e.g., determined via a corresponding PMI), or TCI states (e.g., beams), where the multicast configurations are applicable for all UEs 115 in an MBS group and the unicast configurations are applicable for a single UE 115 or a subset of UEs 115 (e.g., a subgroup 205) in the MBS group.

In some examples, the non-multicast configurations may be specified per subgroup 205. For example, base station 105-a may configure the non-multicast configurations for a UE 115 of the group that receives same multicast or broadcast data from base station 105-a (e.g., MBS group) based on which subgroup 205 is configured for that UE 115. As shown in the example of FIGS. 2A and 2B, UEs 115 in the first subgroup 205-a may be configured with a first set of values for the non-multicast configurations mapped to each DCI value, and UEs 115 in the second subgroup 205-b may be configured with a second set of values for the non-multicast configurations mapped to each DCI value (e.g., DCI field codepoint, codepoint index, etc.).

In some implementations, the DCI values may correspond to TCI state fields (e.g., codepoint indexes), and each value for the multicast configurations and the non-multicast configurations may correspond to different TCI states (e.g., different beams). The TCI states indicated for the multicast configurations may correspond to broader beams that can be used to reach all UEs 115 in the group that receives same multicast or broadcast data from base station 105-a (e.g., MBS group), and the TCI states indicated for the unicast configurations may correspond to narrower beams that can be used to reach a single UE 115 or a subset of the UEs 115 (e.g., a subgroup 205 or a subset of UEs 115 in a subgroup 205). Table 2 illustrates an example of a mapping between the different codepoint values (e.g., TCI state fields) and each of the multicast configurations (e.g., corresponding TCI states for multicast transmissions) and each of the unicast configurations (e.g., corresponding TCI states for non-multicast transmissions), where the unicast configurations are further configured or indicated per subgroup 205 (e.g., or a different grouping configuration).

TABLE 2

Example Codepoint and TCI state Mapping Configuration

| TCI State Field | Multicast Configuration | Non-Multicast Configuration for UEs in Group A | Non-Multicast Configuration for UEs in Group B |
| --- | --- | --- | --- |
| 00 | Multicast TCI State 1 | TCI State 1 | TCI State 1 |
| 01 | Multicast TCI State 2 | TCI State 2 | TCI State 2 |
| 10 | — | TCI State 3 | TCI State 3 |
| 11 | — | TCI State 4 | TCI State 4 |

In Table 2, for a given UE 115 in the group that receives same multicast or broadcast data from base station 105-a (e.g., MBS group), TCI states for a unicast PDSCH and one or more TCI states for a multicast PDSCH may be configured. If the codepoint of the TCI state field (e.g., in a control message scheduling a multicast data transmission, such as a multicast PDCCH or a DCI or both scheduling the multicast data transmission) has an associated TCI state configured for a multicast PDSCH, the UE 115 may assume a TCI state for multicast PDSCH is used for transmitting a subsequent multicast data transmission. Alternatively, if the codepoint of the TCI state field does not have an associated TCI state configured for a multicast PDSCH, the UE 115 may assume a TCI state for unicast PDSCH is used for transmitting a subsequent multicast data transmission (e.g., using the PTM transmission scheme 1), where a corresponding configured TCI state for the group with which the UE 115 is configured is used.

In some implementations, a bit width for a size of the DCI field (e.g., for indicating which multicast configuration or unicast configuration to apply) may be determined by a maximum between a necessary number of codepoints for the DCI field indication. For example, if two (2) codepoints are necessary for indicating a multicast PDSCH that is sent using a multicast configuration (e.g., two multicast configurations are configured) and four (4) codepoints are necessary for indicating a unicast PDSCH (e.g., carrying multicast data in some implementations as described herein) that is sent using a unicast configuration (e.g., four unicast configurations are configured), then the DCI field size may be two (2) bits (e.g., to indicate four possible configurations). Additionally or alternatively, the bit width for a size of the DCI field may be determined based on an association between a codepoint and an index value that is explicitly configured (e.g., by RRC signaling). For example, the association between a codepoint of the DCI field and a configured index value may be determined based on an ascending or descending order of parameters (e.g., RRC parameter) in the configuration, may be determined based on an ascending or descending order of identifiers (IDs) of parameters (e.g., RRC parameters) in a parameter list (e.g., RRC parameter list), may be explicitly configured, or a combination thereof.

Additionally, in some implementations, base station 105-a may configure specific values for any DCI values that do not have an associated value (e.g., or TCI state) for a multicast configuration. For example, for a codepoint of a DCI field that has no value in a multicast configuration, a UE 115 may be configured with a "unicast value" or a "no value" (e.g., null value). In some examples, these specific values (e.g., "unicast value" or "no value") may be configured specific to which subgroup 205 the UE 115 belongs. Table 3 illustrates an example of a mapping between the different codepoint values (e.g., TCI state fields) and each of the multicast configurations (e.g., corresponding TCI states for multicast transmissions) and each of the unicast configurations (e.g., corresponding TCI states for non-multicast transmissions), where both the multicast configurations and the unicast configurations are further configured or indicated per subgroup 205 (e.g., or a different grouping configuration).

TABLE 3

Example of Codepoint and TCI state Mapping Configuration Specific to UE Subgroup

| TCI State Field | Multicast Configuration for UEs in Group A | Multicast Configuration for UEs in Group B | Non-Multicast Configuration for UEs in Group A | Non-Multicast Configuration for UEs in Group B |
| --- | --- | --- | --- | --- |
| 00 | Multicast TCI State 1 | Multicast TCI State 1 | TCI State 1 | TCI State 1 |
| 01 | Multicast TCI State 2 | Multicast TCI State 2 | TCI State 2 | TCI State 2 |
| 10 | Unicast Value | No Value | TCI state 3 | TCI State 3 |
| 11 | No Value | Unicast Value | TCI State 4 | TCI State 4 |

Using Table 3, if the TCI state field (e.g., DCI value, DCI field codepoint, codepoint index, etc.) corresponds to a "unicast value" for a multicast configuration, a UE 115 may assume a unicast PDSCH configured for a corresponding subgroup 205 to which the UE 115 belongs is used to transmit a multicast data (e.g., shared data transmission 220). Alternatively, if the TCI state field corresponds to a "no value," the UE 115 may refrain from receiving the multicast data (e.g., multicast PDSCH, shared data transmission 220, etc.) scheduled by the control channel carrying the TCI state field (e.g., a multicast PDCCH carrying a DCI that indicates which configuration to apply), or the UE 115 may not transmit HARQ-ACK feedback for the multicast data scheduled by the control channel, or both. For non-intended UEs 115 (e.g., UEs 115 for which this particular transmission instance of the multicast data), the multicast data reception or HARQ-ACK transmission may be omitted.

In the example of FIG. 2A, base station 105-a may use a broad beam 210 to transmit the shared data transmission 220 to a set of UEs 115 subscribed to an MBS group to receive multicast or broadcast data from base station 105-a. In some examples, base station 105-a may use the broad beam 210 for an initial transmission of the shared data transmission 220 or for a retransmission of the shared data transmission 220. For example, the broad beam 210 may be used for the initial transmission so that every UE 115 in the MBS group has a chance of receiving the shared data transmission 220. Additionally or alternatively, if multiple NACKs are received from multiple corresponding UEs 115 for a previous transmission of the shared data transmission 220, base station 105-a may determine to use the broad beam 210 for a retransmission of the shared data transmission 220 so that those UEs 115 that transmitted the NACKs may attempt to receive the shared data transmission 220 in the retransmission.

To indicate that the shared data transmission 220 is transmitted according to the broad beam 210 (e.g., or additional transmission parameters to indicate a multicast configuration), base station 105-a may transmit a DCI 215-a in a control channel (e.g., multicast PDSCH) scheduling the shared data transmission 220, where the DCI 215-a includes a set of codepoint values (e.g., DCI values, codepoint indexes, etc.) that map to different multicast configurations and unicast configurations indicated to each UE 115 (e.g., via RRC signaling as described previously). For example, using Tables 1, 2, and 3 described previously, base station 105-a may indicate '00' or '01' in the DCI 215-a to indicate that the shared data transmission 220 is sent using a multicast configuration.

Additionally or alternatively, in the example of FIG. 2B, base station 105-a may use a narrower beam 225 (e.g., compared to the broad beam 210, such as a UE-specific beam) to transmit the shared data transmission 220 to a subset of UEs 115 subscribed to the MBS group. In some examples, base station 105-a may use the narrower beam 225 for a retransmission of the shared data transmission 220. For example, base station 105-a may receive one or more NACKs for an initial transmission of the shared data transmission 220, but the one or more NACKs may be received from UEs 115 within the subset of UEs 115 (e.g., in the second subgroup 205-b). As such, base station 105-a may transmit the shared data transmission 220 directed to the subset of UEs 115 (e.g., using the narrower beam 225, such as a UE-specific beam directed to a specific UE 115 of the subset of UEs 115) rather than using the broad beam 210 that is received by all the UEs 115 in the MBS group, which may result in unnecessary power consumption and processing for those UEs 115 that successfully received the shared data transmission 220 already (e.g., UEs 115 in the first subgroup 205-a).

To indicate that the shared data transmission 220 is transmitted according to the narrower beam 225 (e.g., or additional transmission parameters to indicate a non-multicast configuration, such as parameters to indicate a UE-specific beam), base station 105-a may transmit a DCI 215-b in a control channel (e.g., multicast PDSCH) scheduling the shared data transmission 220, where the DCI 215-b includes a set of codepoint values (e.g., DCI values, codepoint indexes, etc.) that map to different multicast configurations and unicast configurations indicated to each UE 115 (e.g., via RRC signaling as described previously). For example, using Tables 1, 2, and 3 described previously, base station 105-a may indicate '10' or '11' in the DCI 215-a to indicate that the shared data transmission 220 is sent using a non-multicast configuration (e.g., that is specific to the different subgroups 205 as shown in Tables 2 and 3).

Figure 3:
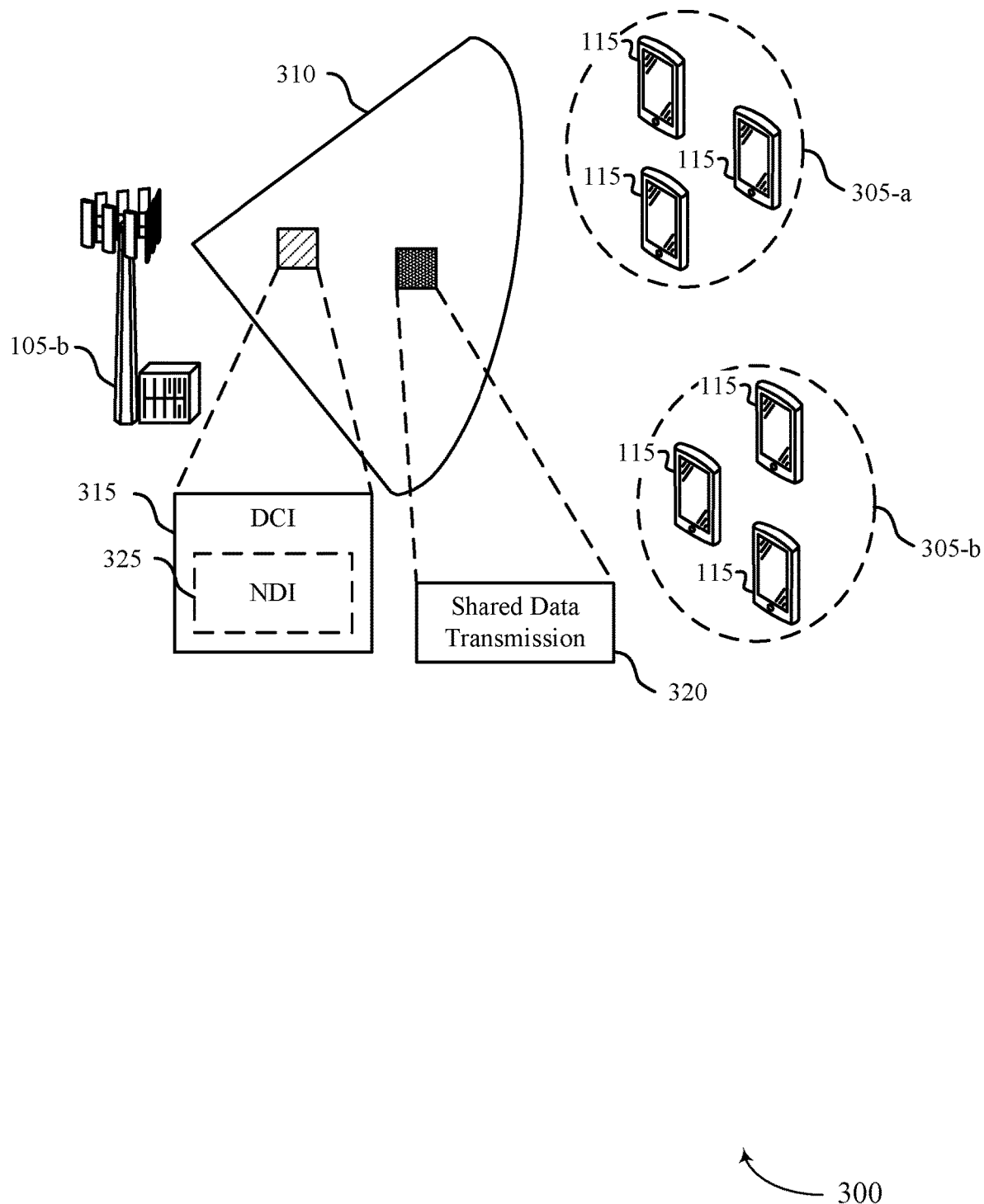
FIG. 3 illustrates an example of an indication scheme that supports indications for multicast and unicast transmissions in accordance with aspects of the present disclosure.

FIG. 3 illustrates an example of an indication scheme 300 that supports indications for multicast and unicast transmissions in accordance with aspects of the present disclosure. Indication scheme 300 may implement aspects of or may be implemented by aspects of wireless communications systems 100, 200, and 201. For example, indication scheme 300 may include a base station 105-b and one or more UEs 115, which may represent examples of base stations 105 and UEs 115, respectively, as described with reference to FIGS. 1-2B. Additionally, the one or more UEs 115 may be part of a same group (e.g., an MBS group) that receives same multicast or broadcast data from base station 105-b. For example, base station 105-b may transmit multicast data to the one or more UEs 115 using a type of PTM communications as described previously (e.g., PTM transmission scheme 1). Additionally, the one or more UEs 115 may be grouped into separate subgroups 305 (e.g., based on which UEs 115 are close in proximity to each other or based on which UEs 115 have similar transmission parameters), such as a first subgroup 305-a and a second subgroup 305-b. In some examples, base station 105-b may use a broad beam 310 to transmit a shared data transmission 320 to the one or more UEs 115 or may use a different beam to transmit the shared data transmission 320 to a subset of the one or more UEs 115.

In some implementations, for a retransmission of the shared data transmission 320 (e.g., multicast PDSCH, multicast data, etc.), one or some DCI fields in a control message scheduling the shared data transmission 320 may be interpreted as if the shared data transmission 320 is transmitted according to a non-multicast configuration (e.g., unicast configuration). In some examples, base station 105-a may indicate whether the shared data transmission 320 is an initial transmission or a retransmission based on whether an NDI 325 (e.g., NDI field) field is toggled or not in a DCI 315 from a last DCI format scheduling the shared data transmission 320 (e.g., multicast PDSCH) with a same HARQ process ID.

As described previously with reference to FIGS. 2A and 2B, one or more UEs 115 of the group that receives same multicast or broadcast data from base station 105-b may be configured with multicast configurations and non-multicast configurations (e.g., unicast configurations). The multicast configurations may represent configurations for multicast PDSCHs (e.g., scheduled or configured with a group-common RNTI), and the non-multicast configurations may represent configurations for non-multicast PDSCHs (e.g., scheduled or configured with a C-RNTI, a CS-RNTI, an MCS-C-RNTI, etc.). Additionally, base station 105-b may provide the multicast configurations via RRC signaling to the one or more UEs 115 as part of a multicast PDSCH configuration and may also provide the unicast configurations by RRC signaling to the one or more UEs 115 as part of unicast PDSCH configuration.

When receiving the multicast configurations and the unicast configurations, the one or more UEs 115 may also receive or determine a mapping between different codepoint values (e.g., codepoint indexes) and each of the multicast configurations and each of the unicast configurations (e.g., via a codepoint configuration). In some examples, the codepoint values may be DCI field codepoints, DCI codepoint indexes, or other DCI values. Table 4 illustrates an example of a mapping between the different codepoint values and each of the multicast configurations and each of the unicast configurations.

TABLE 4

Example of Codepoint Mapping Configuration

| DCI Field Codepoint | Multicast Configuration | Non-Multicast Configuration |
| --- | --- | --- |
| 00 | Value 1 | Value 1 |
| 01 | Value 2 | Value 2 |
| 10 | Value 3 | Value 3 |
| 11 | Value 4 | Value 4 |

Unlike Tables 1, 2, and 3 as described with reference to FIGS. 2A and 2B, Table 4 may include specific values for the multicast configurations and for the non-multicast configurations mapped to each DCI codepoint. For example, rather than having no values defined or having a "unicast value" or "no value" configured for the multicast configurations mapped to the DCI codepoints '10' and '11,' base station 105-b may configure specific values. Accordingly, for a DCI format that schedules an initial transmission of the shared data transmission 320 (e.g., NDI 325 is toggled), the UEs 115 may interpret the DCI codepoints based on the multicast configuration values. Alternatively, for a DCI format that schedules a retransmission of the shared data transmission 320 (e.g., NDI 325 is not toggled), the UEs 115 may interpret the DCI codepoints based on the non-multicast configurations.

For example, base station 105-b may transmit the DCI 315 to schedule the shared data transmission 320 according to a multicast configuration or a non-multicast configuration based on a DCI codepoint included in the DCI 315 being mapped to a corresponding value for a multicast configuration or a non-multicast configuration. To indicate which of the multicast configuration values or non-multicast configuration values the UEs 115 should apply for receiving the shared data transmission 320, base station 105-b may include the NDI 325 in the DCI 315 to indicate whether the shared data transmission 320 is an initial transmission of a multicast data or a retransmission of that multicast data. If the NDI 325 indicates the shared data transmission 320 is the initial transmission, the UEs 115 may use the multicast configuration values to apply for receiving the shared data transmission 320. Alternatively, if the NDI 325 indicates the shared data transmission 320 is a retransmission, the UEs 115 may use the non-multicast configuration values to apply for receiving the shared data transmission 320.

Figure 4:
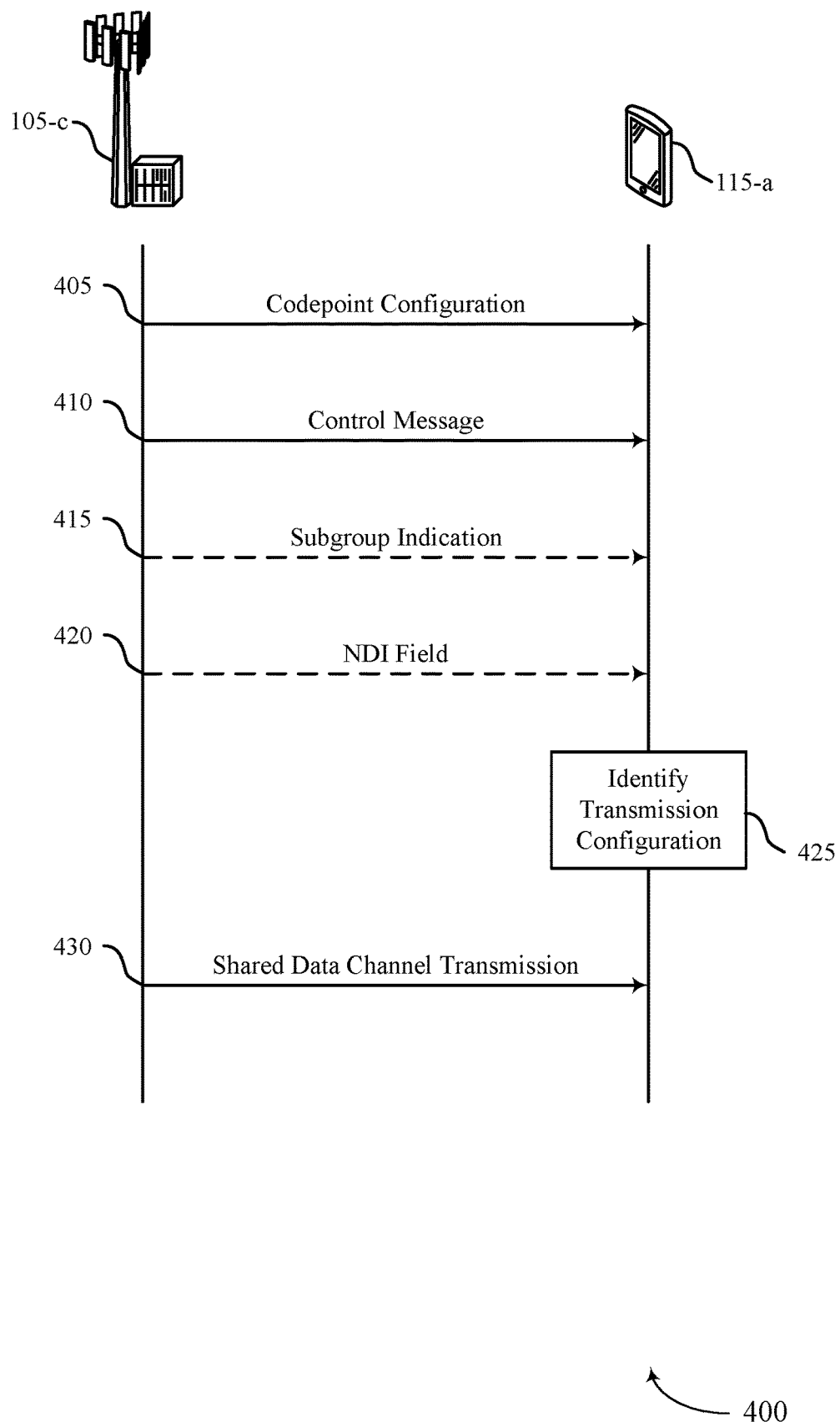
FIG. 4 illustrates an example of a process flow that supports indications for multicast and unicast transmissions in accordance with aspects of the present disclosure.

FIG. 4 illustrates an example of a process flow 400 that supports indications for multicast and unicast transmissions in accordance with aspects of the present disclosure. In some examples, process flow 400 may implement aspects of wireless communications systems 100, 200, and 201. For example, process flow 400 may include a base station 105-c and a UE 115-a, which may be examples of a corresponding base station 105 and UE 115, respectively, as described above with reference to FIGS. 1 through 3.

In the following description of the process flow 400, the operations between UE 115-a and base station 105-c may be performed in different orders or at different times. Certain operations may also be left out of the process flow 400, or other operations may be added to the process flow 400. It is to be understood that while UE 115-a and base station 105-c are shown performing a number of the operations of process flow 400, any wireless device may perform the operations shown.

At 405, UE 115-a may receive, from base station 105-c, a codepoint configuration for a PTM transmission scheme that indicates a mapping between a set of codepoint indexes, a set of multicast configurations, and a set of unicast configurations.

At 410, UE 115-a may receive, from base station 105-c, a control message that schedules a shared data channel transmission for at least one UE of a UE group including a set of UEs including the first UE, the control message including a first codepoint index of the set of codepoint indexes. In some examples, the shared data channel transmission may include a shared data channel associated with a group-common RNTI (e.g., a group UE ID-like parameter). For example, UE 115-a may receive, from base station 105-c, a group-common control message with a CRC scrambled by a group-common RNTI corresponding to the UE group, and the group-common control message may schedule a group-common shared data channel transmission that is scrambled with the group-common RNTI, where the control message includes the group-common control message and the shared data channel transmission includes the group-common shared data channel transmission.

In some implementations, UE 115-a may receive, from base station 105-c, the control message including the first codepoint index in a field having a bit width that is determined based on a first number of codepoint indexes of the set of codepoint indexes that correspond to the set of multicast configurations, a second number of codepoint indexes of the set of codepoint indexes that correspond to the set of unicast configurations, or both.

Additionally or alternatively, UE 115-a may receive, from base station 105-c, the control message including the first codepoint index in a field having a bit width that is determined based on the mapping indicating an association between a respective codepoint index of the set of codepoint indexes and a respective index value of a set of index values. For example, UE 115-a may receive the codepoint configuration that indicates the association. In some implementations, the association may be determined based on an ascending order or a descending order of parameters indicated in the codepoint configuration. Additionally or alternatively, the association may be determined based on an ascending order or a descending order of identifiers of one or more parameters indicated in the codepoint configuration.

In some implementations, UE 115-a may receive, from base station 105-c at 405, the codepoint configuration indicating a unicast value corresponding to a second codepoint index value of the set of codepoint indexes and a null value corresponding to a third codepoint index value of the set of codepoint indexes. Subsequently, UE 115-a may receive, from base station 105-c, a second control message that schedules a second shared data channel transmission for the UE group, and UE 115-a may determine to refrain from receiving the second shared data channel transmission or from transmitting acknowledgment feedback for the second shared data channel transmission based on a second codepoint index included in the second control message having the third codepoint index value.

At 415, UE 115-a may receive, from base station 105-c, an indication of a subgroup of the UE group to which UE 115-a belongs. For example, base station 105-a may assign each UE 115 in the UE group into corresponding subgroups. In some implementations, each subgroup may include a subset of the UE group based on which UEs 115 are geographically close to each other or which UEs 115 have similar transmission parameters.

At 420, UE 115-a may receive, from base station 105-c, an NDI field in the control message. For example, the NDI may indicate whether the shared data channel transmission is a retransmission of a previous shared data channel transmission or not.

At 425, UE 115-a may identify a transmission configuration that is one of a first multicast configuration of the set of multicast configurations or a first unicast configuration of the set of unicast configurations to apply for receiving the shared data channel transmission (e.g., from base station 105-c) based on the mapping and the first codepoint index. In some implementations, the identifying which of the first multicast configuration or the first unicast configuration to apply may be based on UE 115-a being in the subgroup. Additionally or alternatively, the identifying which of the first multicast configuration or the first unicast configuration to apply may be based on a value of the NDI field. Additionally, the first unicast configuration (e.g., or any of the unicast configurations of the set of unicast configurations) may include a configuration for the shared data channel transmission that is associated with a C-RNTI (e.g., a UE ID-like parameter).

In some implementations, when receiving the codepoint configuration at 405, UE 115-a may receive a first codepoint mapping configuration that maps a first subset of the set of codepoint indexes to the set of multicast configurations and a second codepoint mapping configuration that maps each of the set of codepoint indexes to a respective unicast configuration of the set of unicast configurations. Subsequently, at 425, UE 115-a may identify that the transmission configuration is the first multicast configuration based on the first codepoint index occurring within the first subset of the set of codepoint indexes. Alternatively, at 425, UE 115-a may identify that the transmission configuration is the first unicast configuration based on the first codepoint index occurring outside of the first subset of the set of codepoint indexes.

At 430, UE 115-a may receive, from base station 105-c, the shared data channel transmission in accordance with the identified transmission configuration. For example, UE 115-a may receive the shared data channel transmission in accordance with a parameter indicated by the identified transmission configuration. In some examples, the parameter may include a TCI state, a resource allocation, an MCS, a PMI, or any combination thereof.

Figure 5:
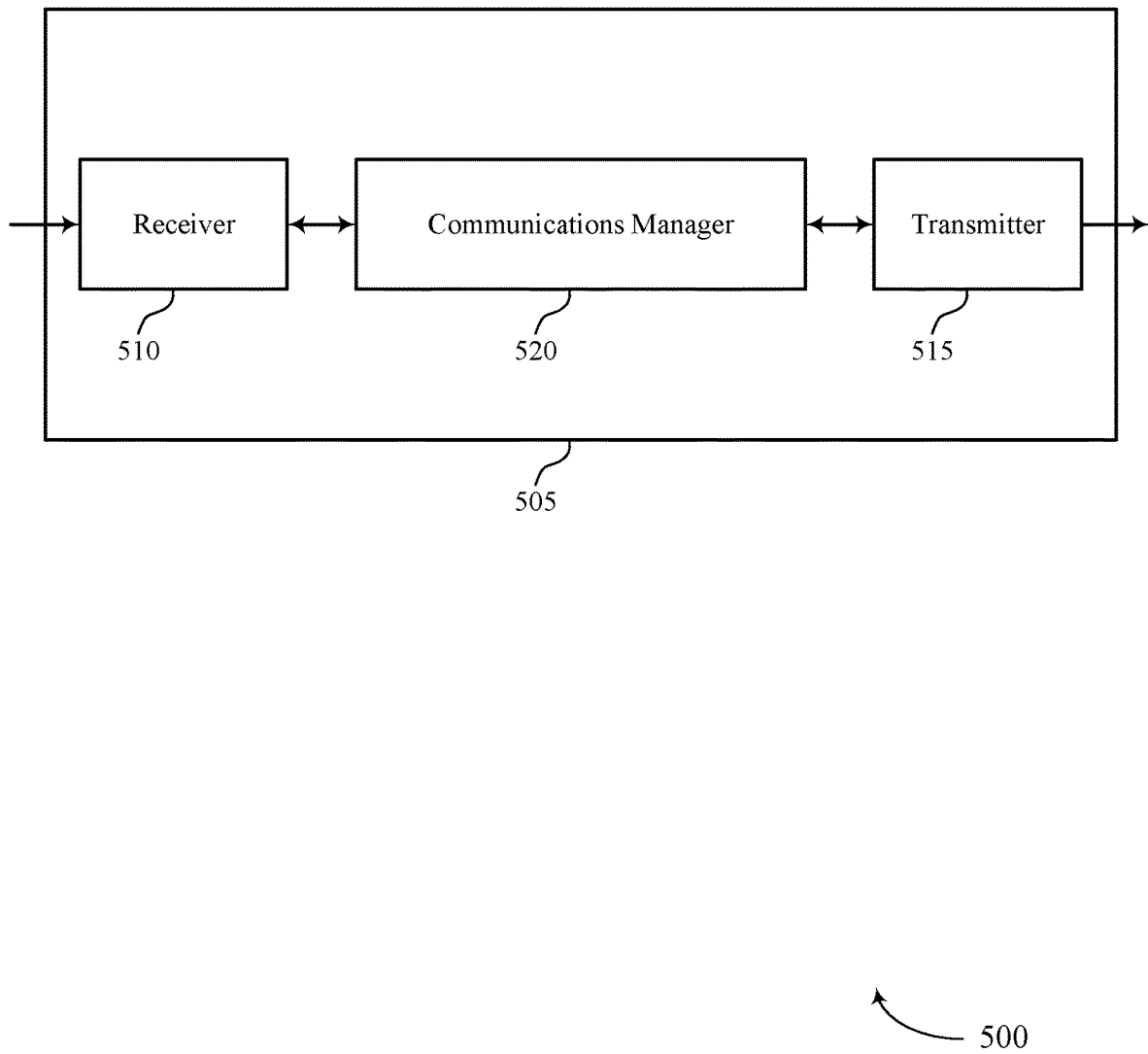
FIGS. 5 and 6 show block diagrams of devices that support indications for multicast and unicast transmissions in accordance with aspects of the present disclosure.

FIG. 5 shows a block diagram 500 of a device 505 that supports indications for multicast and unicast transmissions in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to indications for multicast and unicast transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to indications for multicast and unicast transmissions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of indications for multicast and unicast transmissions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for receiving a codepoint configuration for a PTM transmission scheme that indicates a mapping between a set of multiple codepoint indexes, a set of multiple multicast configurations, and a set of multiple unicast configurations. The communications manager 520 may be configured as or otherwise support a means for receiving a control message that schedules a shared data channel transmission for at least one UE of a UE group including a set of multiple UEs including the first UE, the control message including a first codepoint index of the set of multiple codepoint indexes. The communications manager 520 may be configured as or otherwise support a means for identifying a transmission configuration that is one of a first multicast configuration of the set of multiple multicast configurations or a first unicast configuration of the set of multiple unicast configurations to apply for receiving the shared data channel transmission based on the mapping and the first codepoint index. The communications manager 520 may be configured as or otherwise support a means for receiving the shared data channel transmission in accordance with the identified transmission configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved reliability, reduced processing, and reduced power consumption. For example, the device 505 may have improved reliability based on a transmission of multicast data being configured more specifically to the device 505. Additionally or alternatively, if the device 505 has already successfully received the multicast data, the device 505 may refrain from receiving a subsequent transmission of the multicast data or the transmission of the multicast data may not be directed towards the device 505, thereby saving processing power and power consumption that would arise from decoding a transmission to obtain already received multicast data.

Figure 6:
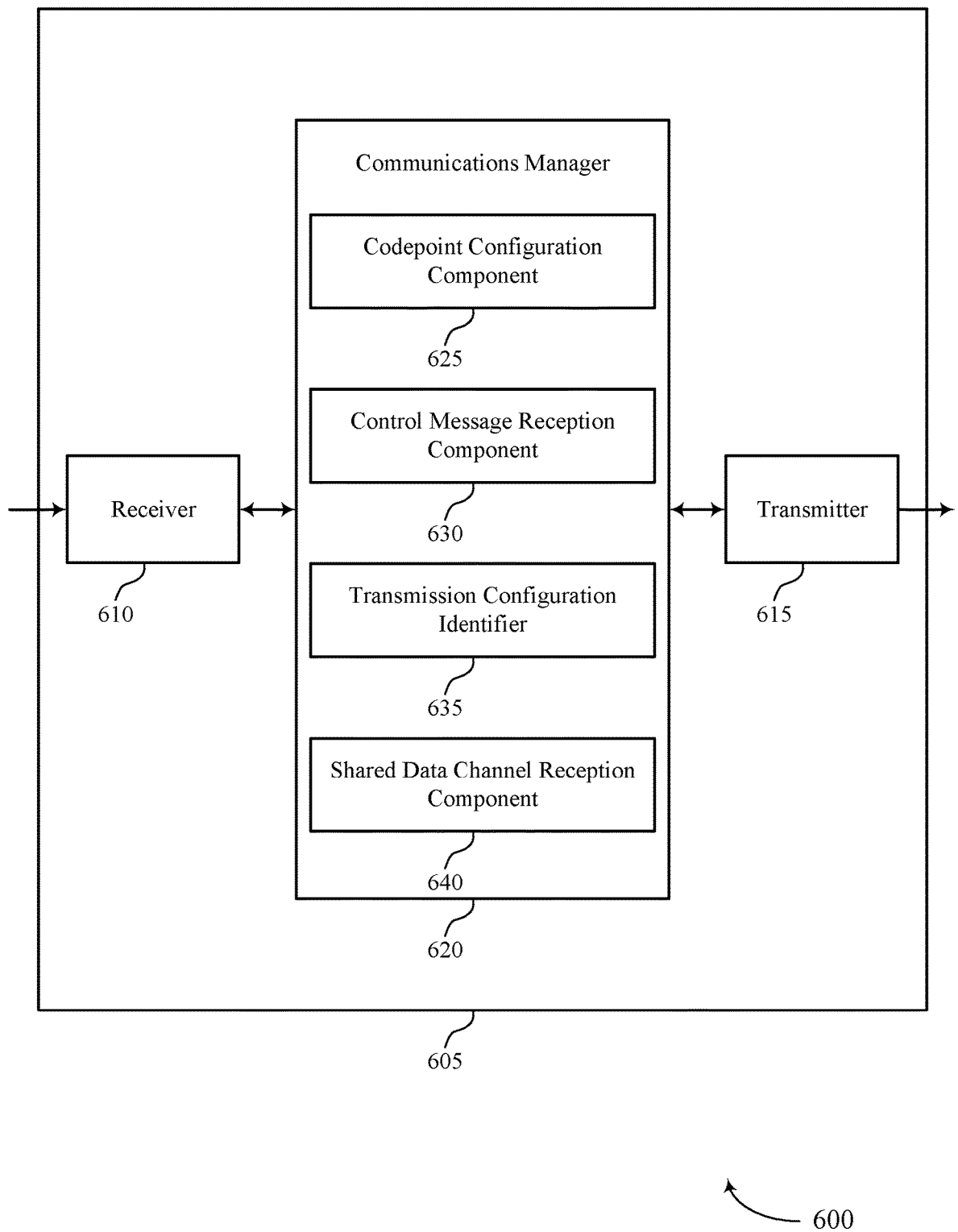

FIG. 6 shows a block diagram 600 of a device 605 that supports indications for multicast and unicast transmissions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to indications for multicast and unicast transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to indications for multicast and unicast transmissions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of indications for multicast and unicast transmissions as described herein. For example, the communications manager 620 may include a codepoint configuration component 625, a control message reception component 630, a transmission configuration identifier 635, a shared data channel reception component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The codepoint configuration component 625 may be configured as or otherwise support a means for receiving a codepoint configuration for a PTM transmission scheme that indicates a mapping between a set of multiple codepoint indexes, a set of multiple multicast configurations, and a set of multiple unicast configurations. The control message reception component 630 may be configured as or otherwise support a means for receiving a control message that schedules a shared data channel transmission for at least one UE of a UE group including a set of multiple UEs including the first UE, the control message including a first codepoint index of the set of multiple codepoint indexes. The transmission configuration identifier 635 may be configured as or otherwise support a means for identifying a transmission configuration that is one of a first multicast configuration of the set of multiple multicast configurations or a first unicast configuration of the set of multiple unicast configurations to apply for receiving the shared data channel transmission based on the mapping and the first codepoint index. The shared data channel reception component 640 may be configured as or otherwise support a means for receiving the shared data channel transmission in accordance with the identified transmission configuration.

Figure 7:
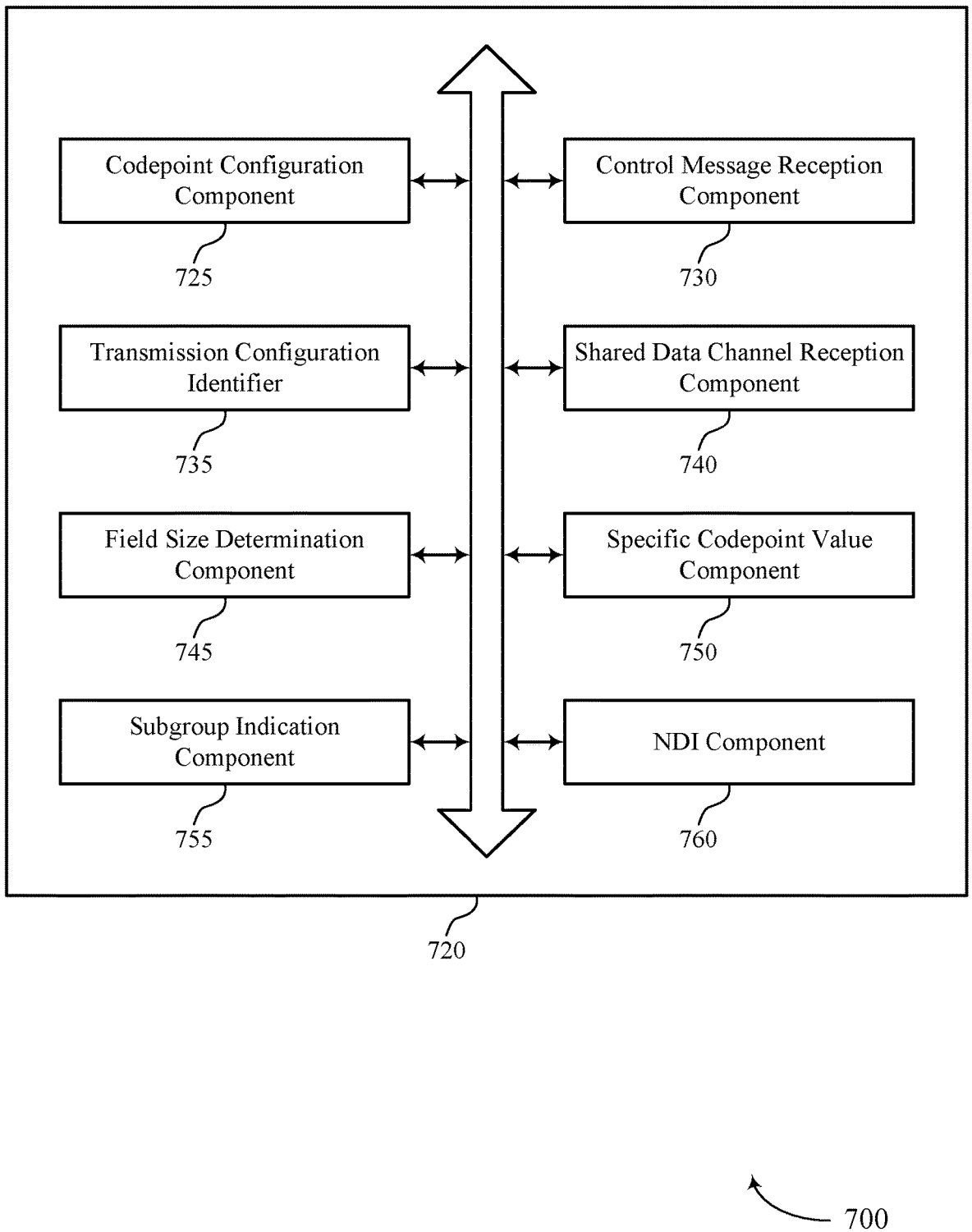
FIG. 7 shows a block diagram of a communications manager that supports indications for multicast and unicast transmissions in accordance with aspects of the present disclosure.

FIG. 7 shows a block diagram 700 of a communications manager 720 that supports indications for multicast and unicast transmissions in accordance with aspects of the present disclosure. The communications manager 720 may be an example of aspects of a communications manager 520, a communications manager 620, or both, as described herein. The communications manager 720, or various components thereof, may be an example of means for performing various aspects of indications for multicast and unicast transmissions as described herein. For example, the communications manager 720 may include a codepoint configuration component 725, a control message reception component 730, a transmission configuration identifier 735, a shared data channel reception component 740, a field size determination component 745, a specific codepoint value component 750, a subgroup indication component 755, an NDI component 760, or any combination thereof. Each of these components may communicate, directly or indirectly, with one another (e.g., via one or more buses).

The communications manager 720 may support wireless communications at a first UE in accordance with examples as disclosed herein. The codepoint configuration component 725 may be configured as or otherwise support a means for receiving a codepoint configuration for a PTM transmission scheme that indicates a mapping between a set of multiple codepoint indexes, a set of multiple multicast configurations, and a set of multiple unicast configurations. The control message reception component 730 may be configured as or otherwise support a means for receiving a control message that schedules a shared data channel transmission for at least one UE of a UE group including a set of multiple UEs including the first UE, the control message including a first codepoint index of the set of multiple codepoint indexes. The transmission configuration identifier 735 may be configured as or otherwise support a means for identifying a transmission configuration that is one of a first multicast configuration of the set of multiple multicast configurations or a first unicast configuration of the set of multiple unicast configurations to apply for receiving the shared data channel transmission based on the mapping and the first codepoint index. The shared data channel reception component 740 may be configured as or otherwise support a means for receiving the shared data channel transmission in accordance with the identified transmission configuration.

In some examples, to support receiving the codepoint configuration, the codepoint configuration component 725 may be configured as or otherwise support a means for receiving a first codepoint mapping configuration that maps a first subset of the set of multiple codepoint indexes to the set of multiple multicast configurations. In some examples, to support receiving the codepoint configuration, the codepoint configuration component 725 may be configured as or otherwise support a means for receiving a second codepoint mapping configuration that maps each of the set of multiple codepoint indexes to a respective unicast configuration of the set of multiple unicast configurations.

In some examples, to support identifying the transmission configuration, the transmission configuration identifier 735 may be configured as or otherwise support a means for identifying that the transmission configuration is the first multicast configuration based on the first codepoint index occurring within the first subset of the set of multiple codepoint indexes.

In some examples, to support identifying the transmission configuration, the transmission configuration identifier 735 may be configured as or otherwise support a means for identifying that the transmission configuration is the first unicast configuration based on the first codepoint index occurring outside of the first subset of the set of multiple codepoint indexes.

In some examples, to support receiving the shared data channel transmission, the shared data channel reception component 740 may be configured as or otherwise support a means for receiving the shared data channel transmission in accordance with a parameter indicated by the identified transmission configuration.

In some examples, the parameter includes a TCI state, a resource allocation, an MCS, a PMI, or any combination thereof.

In some examples, to support receiving the control message, the field size determination component 745 may be configured as or otherwise support a means for receiving the control message including the first codepoint index in a field having a bit width that is determined based on a first number of codepoint indexes of the set of multiple codepoint indexes that correspond to the set of multiple multicast configurations, a second number of codepoint indexes of the set of multiple codepoint indexes that correspond to the set of multiple unicast configurations, or both.

In some examples, to support receiving the control message, the field size determination component 745 may be configured as or otherwise support a means for receiving the control message including the first codepoint index in a field having a bit width that is determined based on the mapping indicating an association between a respective codepoint index of the set of multiple codepoint indexes and a respective index value of a set of multiple index values.

In some examples, to support receiving the codepoint configuration, the field size determination component 745 may be configured as or otherwise support a means for receiving the codepoint configuration that indicates the association.

In some examples, the association is determined based on an ascending order or a descending order of parameters indicated in the codepoint configuration.

In some examples, the association is determined based on an ascending order or a descending order of IDs of one or more parameters indicated in the codepoint configuration.

In some examples, to support receiving the codepoint configuration, the specific codepoint value component 750 may be configured as or otherwise support a means for receiving the codepoint configuration indicating a unicast value corresponding to a second codepoint index value of the set of multiple codepoint indexes and a null value corresponding to a third codepoint index value of the set of multiple codepoint indexes.

In some examples, the specific codepoint value component 750 may be configured as or otherwise support a means for receiving a second control message that schedules a second shared data channel transmission for the UE group. In some examples, the specific codepoint value component 750 may be configured as or otherwise support a means for determining to refrain from receiving the second shared data channel transmission or from transmitting acknowledgment feedback for the second shared data channel transmission based on a second codepoint index included in the second control message having the third codepoint index value.

In some examples, the subgroup indication component 755 may be configured as or otherwise support a means for receiving an indication of a subgroup of the UE group to which the first UE belongs, where the identifying which of the first multicast configuration or the first unicast configuration to apply is based on the first UE being in the subgroup.

In some examples, to support receiving the control message, the NDI component 760 may be configured as or otherwise support a means for receiving an NDI field in the control message, where the identifying which of the first multicast configuration or the first unicast configuration to apply is based on a value of the NDI field.

In some examples, to support receiving the control message, the control message reception component 730 may be configured as or otherwise support a means for receiving a group-common control message with a CRC scrambled by a group-common RNTI corresponding to the UE group, the group-common control message scheduling a group-common shared data channel transmission that is scrambled with the group-common RNTI, where the control message includes the group-common control message and the shared data channel transmission includes the group-common shared data channel transmission.

Figure 8:
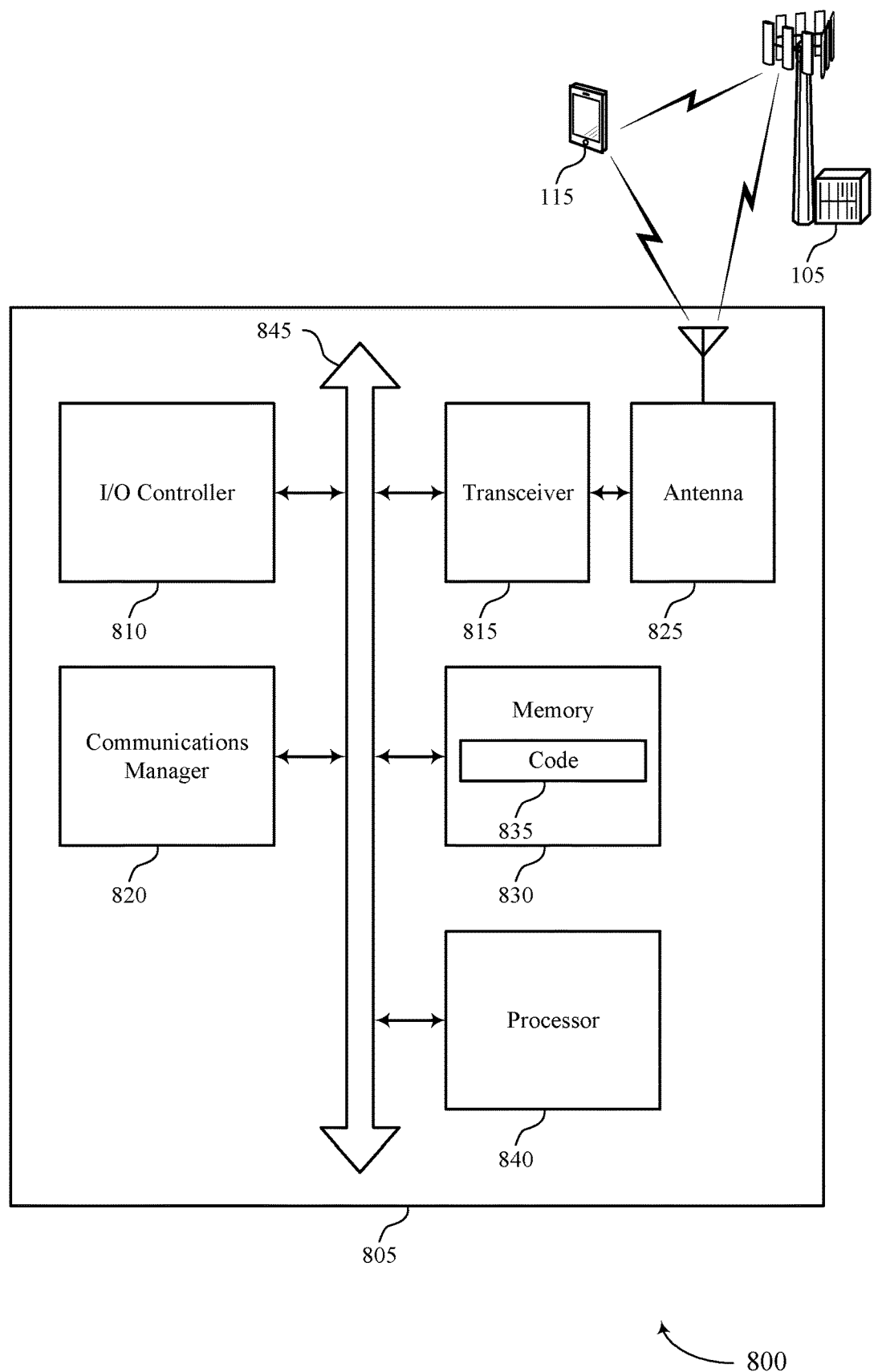
FIG. 8 shows a diagram of a system including a device that supports indications for multicast and unicast transmissions in accordance with aspects of the present disclosure.

FIG. 8 shows a diagram of a system 800 including a device 805 that supports indications for multicast and unicast transmissions in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting indications for multicast and unicast transmissions). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for receiving a codepoint configuration for a PTM transmission scheme that indicates a mapping between a set of multiple codepoint indexes, a set of multiple multicast configurations, and a set of multiple unicast configurations. The communications manager 820 may be configured as or otherwise support a means for receiving a control message that schedules a shared data channel transmission for at least one UE of a UE group including a set of multiple UEs including the first UE, the control message including a first codepoint index of the set of multiple codepoint indexes. The communications manager 820 may be configured as or otherwise support a means for identifying a transmission configuration that is one of a first multicast configuration of the set of multiple multicast configurations or a first unicast configuration of the set of multiple unicast configurations to apply for receiving the shared data channel transmission based on the mapping and the first codepoint index. The communications manager 820 may be configured as or otherwise support a means for receiving the shared data channel transmission in accordance with the identified transmission configuration.

By including or configuring the communications manager 820 in accordance with examples as described herein, the device 805 may support techniques for improved communication reliability, improved user experience related to reduced processing, and reduced power consumption, among other advantages. For example, using the codepoint configuration, transmissions of multicast data may be configured more specifically to devices that have yet to fully receive the multicast data. As such, those devices may have improved communication reliability based on the transmissions of the multicast data being more catered to those devices. Additionally, devices that had successfully received the multicast data previously may ignore the transmissions of multicast data or the transmissions may not be sent to those devices, and, as such, those devices may have reduced processing and reduced power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of indications for multicast and unicast transmissions as described herein, or the processor 840 and the memory 830 may be otherwise configured to perform or support such operations.

Figure 9:
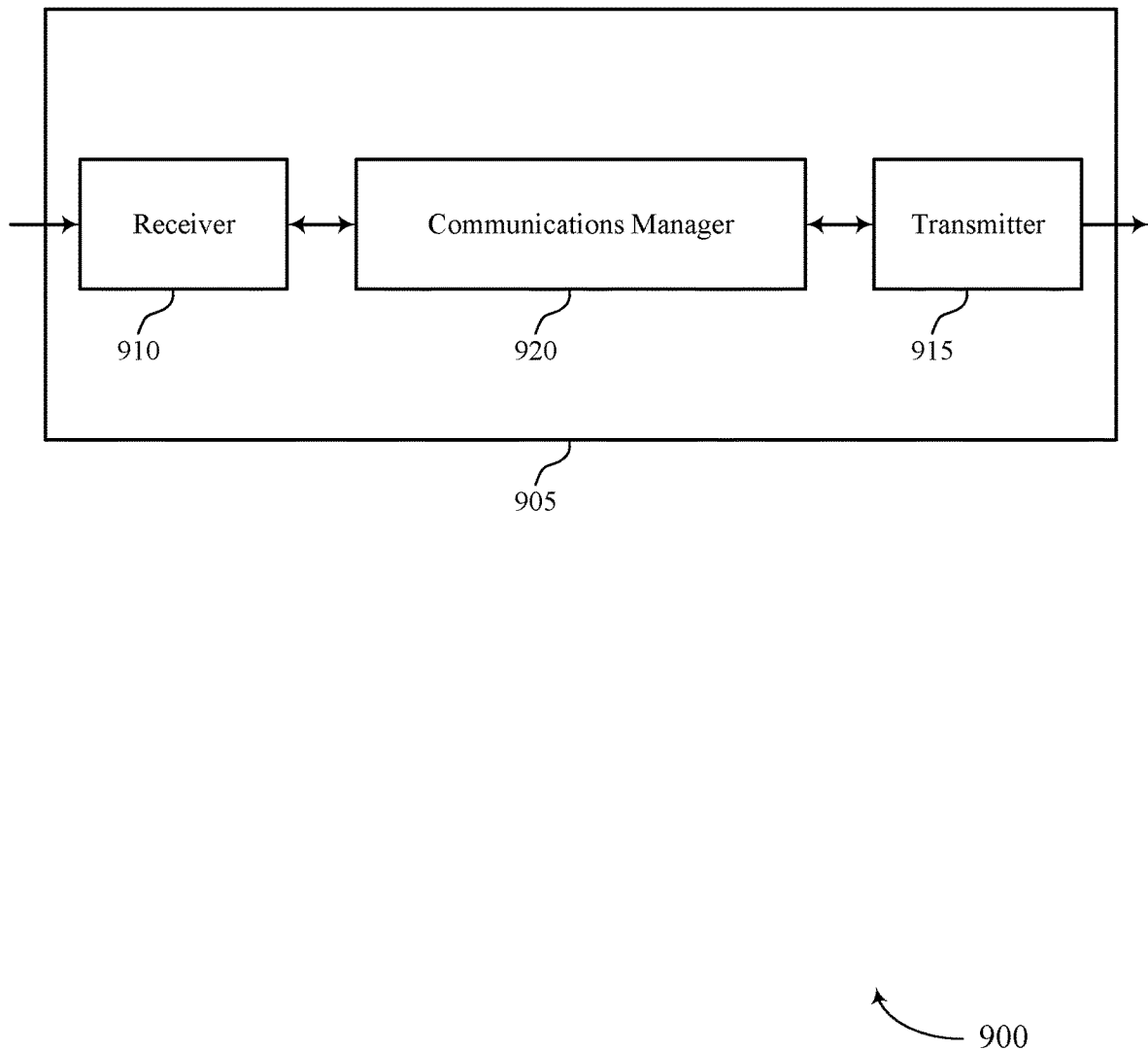
FIGS. 9 and 10 show block diagrams of devices that support indications for multicast and unicast transmissions in accordance with aspects of the present disclosure.

FIG. 9 shows a block diagram 900 of a device 905 that supports indications for multicast and unicast transmissions in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to indications for multicast and unicast transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to indications for multicast and unicast transmissions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of indications for multicast and unicast transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting a codepoint configuration for a PTM transmission scheme that indicates a mapping between a set of multiple codepoint indexes, a set of multiple multicast configurations, and a set of multiple unicast configurations. The communications manager 920 may be configured as or otherwise support a means for transmitting a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations. The communications manager 920 may be configured as or otherwise support a means for transmitting the shared data channel transmission in accordance with the indicated transmission configuration.

Figure 10:
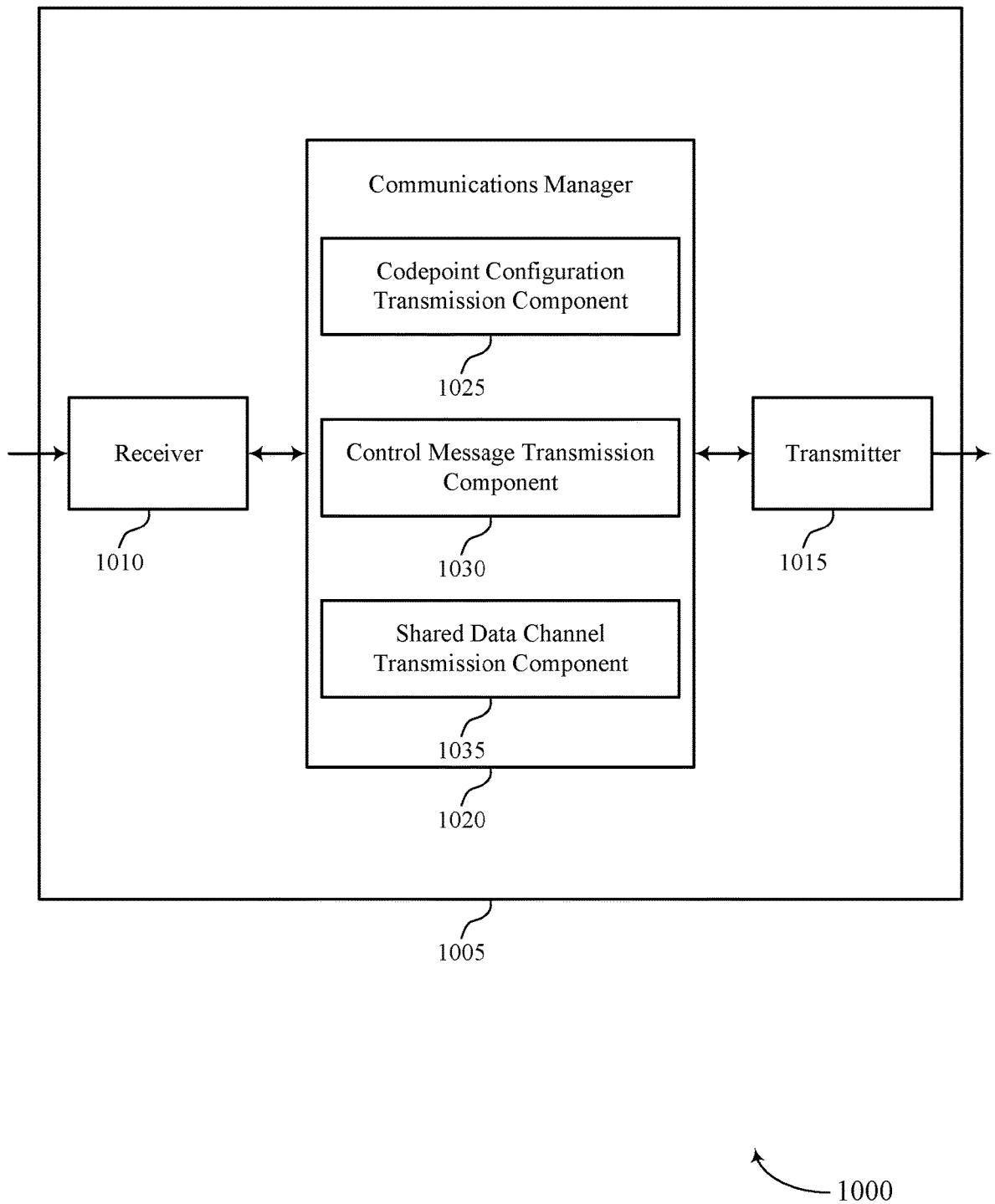

FIG. 10 shows a block diagram 1000 of a device 1005 that supports indications for multicast and unicast transmissions in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to indications for multicast and unicast transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to indications for multicast and unicast transmissions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of indications for multicast and unicast transmissions as described herein. For example, the communications manager 1020 may include a codepoint configuration transmission component 1025, a control message transmission component 1030, a shared data channel transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The codepoint configuration transmission component 1025 may be configured as or otherwise support a means for transmitting a codepoint configuration for a PTM transmission scheme that indicates a mapping between a set of multiple codepoint indexes, a set of multiple multicast configurations, and a set of multiple unicast configurations. The control message transmission component 1030 may be configured as or otherwise support a means for transmitting a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations. The shared data channel transmission component 1035 may be configured as or otherwise support a means for transmitting the shared data channel transmission in accordance with the indicated transmission configuration.

Figure 11:
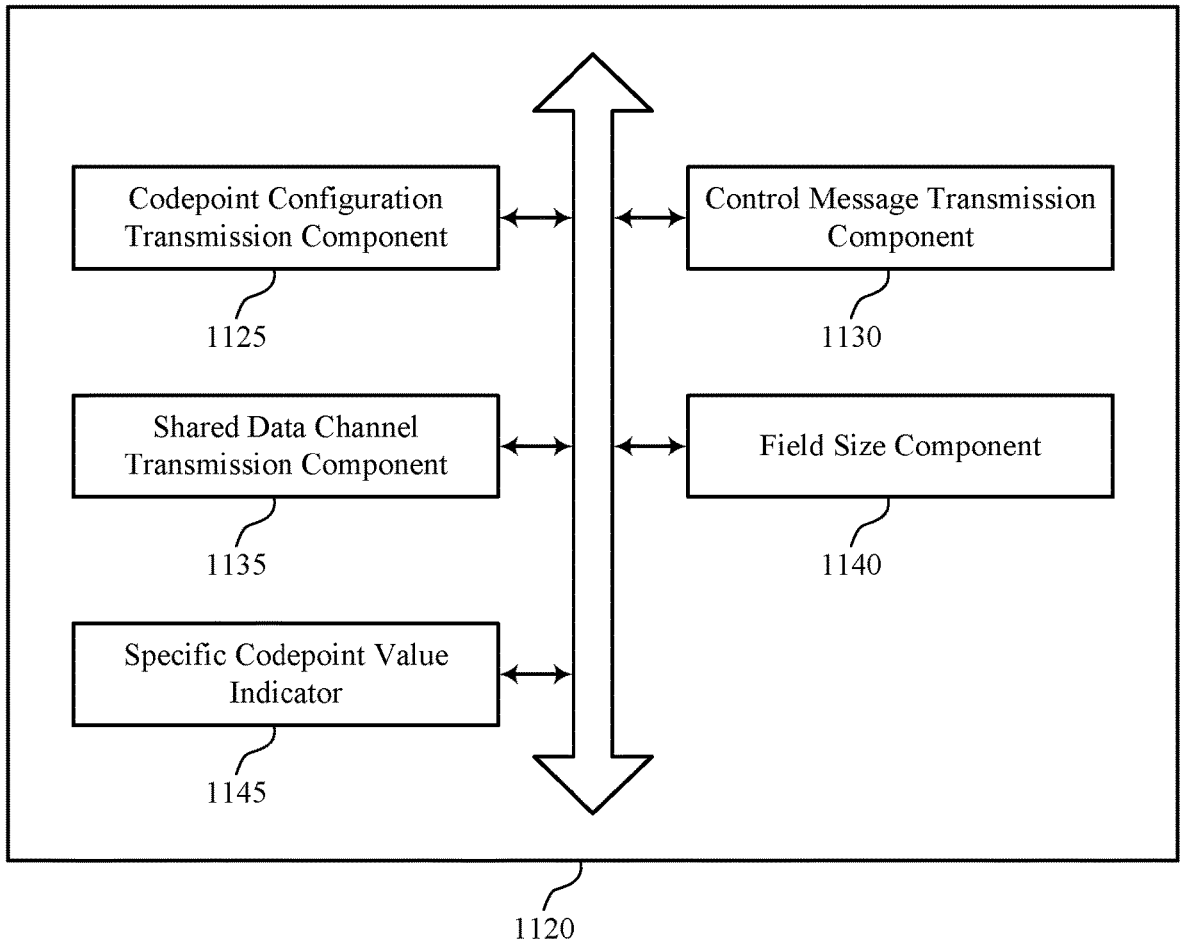
FIG. 11 shows a block diagram of a communications manager that supports indications for multicast and unicast transmissions in accordance with aspects of the present disclosure.

FIG. 11 shows a block diagram 1100 of a communications manager 1120 that supports indications for multicast and unicast transmissions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of indications for multicast and unicast transmissions as described herein. For example, the communications manager 1120 may include a codepoint configuration transmission component 1125, a control message transmission component 1130, a shared data channel transmission component 1135, a field size component 1140, a specific codepoint value indicator 1145, or any combination thereof. Each of these components may communicate, directly or indirectly, with one another (e.g., via one or more buses).

The communications manager 1120 may support wireless communications at a base station in accordance with examples as disclosed herein. The codepoint configuration transmission component 1125 may be configured as or otherwise support a means for transmitting a codepoint configuration for a PTM transmission scheme that indicates a mapping between a set of multiple codepoint indexes, a set of multiple multicast configurations, and a set of multiple unicast configurations. The control message transmission component 1130 may be configured as or otherwise support a means for transmitting a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations. The shared data channel transmission component 1135 may be configured as or otherwise support a means for transmitting the shared data channel transmission in accordance with the indicated transmission configuration.

In some examples, to support transmitting the codepoint configuration, the codepoint configuration transmission component 1125 may be configured as or otherwise support a means for transmitting a first codepoint mapping configuration that maps a first subset of the set of multiple codepoint indexes to the set of multiple multicast configurations. In some examples, to support transmitting the codepoint configuration, the codepoint configuration transmission component 1125 may be configured as or otherwise support a means for transmitting a second codepoint mapping configuration that maps each of the set of multiple codepoint indexes to a respective unicast configuration of the set of multiple unicast configurations.

In some examples, to support transmitting the control message, the codepoint configuration transmission component 1125 may be configured as or otherwise support a means for transmitting the control message including the first codepoint index to indicate the transmission configuration is the first multicast configuration based on the first codepoint index occurring within the first subset of the set of multiple codepoint indexes.

In some examples, to support transmitting the control message, the codepoint configuration transmission component 1125 may be configured as or otherwise support a means for transmitting the control message including the first codepoint index to indicate the transmission configuration is the first unicast configuration based on the first codepoint index occurring outside of the first subset of the set of multiple codepoint indexes.

In some examples, to support transmitting the shared data channel transmission, the shared data channel transmission component 1135 may be configured as or otherwise support a means for transmitting the shared data channel transmission in accordance with a parameter indicated by the transmission configuration.

In some examples, the parameter includes a TCI state, a resource allocation, an MCS, a PMI, or any combination thereof.

In some examples, to support transmitting the control message, the field size component 1140 may be configured as or otherwise support a means for transmitting the control message including the first codepoint index in a field having a bit width that is determined based on a first number of codepoint indexes of the set of multiple codepoint indexes that correspond to the set of multiple multicast configurations, a second number of codepoint indexes of the set of multiple codepoint indexes that correspond to the set of multiple unicast configurations, or both.

In some examples, to support transmitting the control message, the field size component 1140 may be configured as or otherwise support a means for transmitting the control message including the first codepoint index in a field having a bit width that is determined based on the mapping indicating an association between a respective codepoint index of the set of multiple codepoint indexes and a respective index value of a set of multiple index values.

In some examples, to support transmitting the codepoint configuration, the field size component 1140 may be configured as or otherwise support a means for transmitting the codepoint configuration that indicates the association.

In some examples, the association is determined based on an ascending order or a descending order of parameters indicated in the codepoint configuration.

In some examples, the association is determined based on an ascending order or a descending order of identifiers of one or more parameters indicated in the codepoint configuration.

In some examples, to support transmitting the codepoint configuration, the specific codepoint value indicator 1145 may be configured as or otherwise support a means for transmitting the codepoint configuration indicating a unicast value corresponding to a second codepoint index value of the set of multiple codepoint indexes and a null value corresponding to a third codepoint index value of the set of multiple codepoint indexes.

In some examples, the control message transmission component 1130 may be configured as or otherwise support a means for transmitting an indication of two or more subgroups of the UE group to which each UE in the UE group belongs, where the indication of the first multicast configuration or the first unicast configuration is based on the indication of the two or more subgroups.

In some examples, to support transmitting the control message, the control message transmission component 1130 may be configured as or otherwise support a means for transmitting an NDI field in the control message, where the indication of the first multicast configuration or the first unicast configuration is based on a value of the NDI field.

In some examples, to support transmitting the control message, the control message transmission component 1130 may be configured as or otherwise support a means for transmitting a group-common control message with a CRC scrambled by a group-common RNTI corresponding to the UE group, the group-common control message scheduling a group-common shared data channel transmission that is scrambled with the group-common RNTI, where the control message includes the group-common control message and the shared data channel transmission includes the group-common shared data channel transmission.

Figure 12:
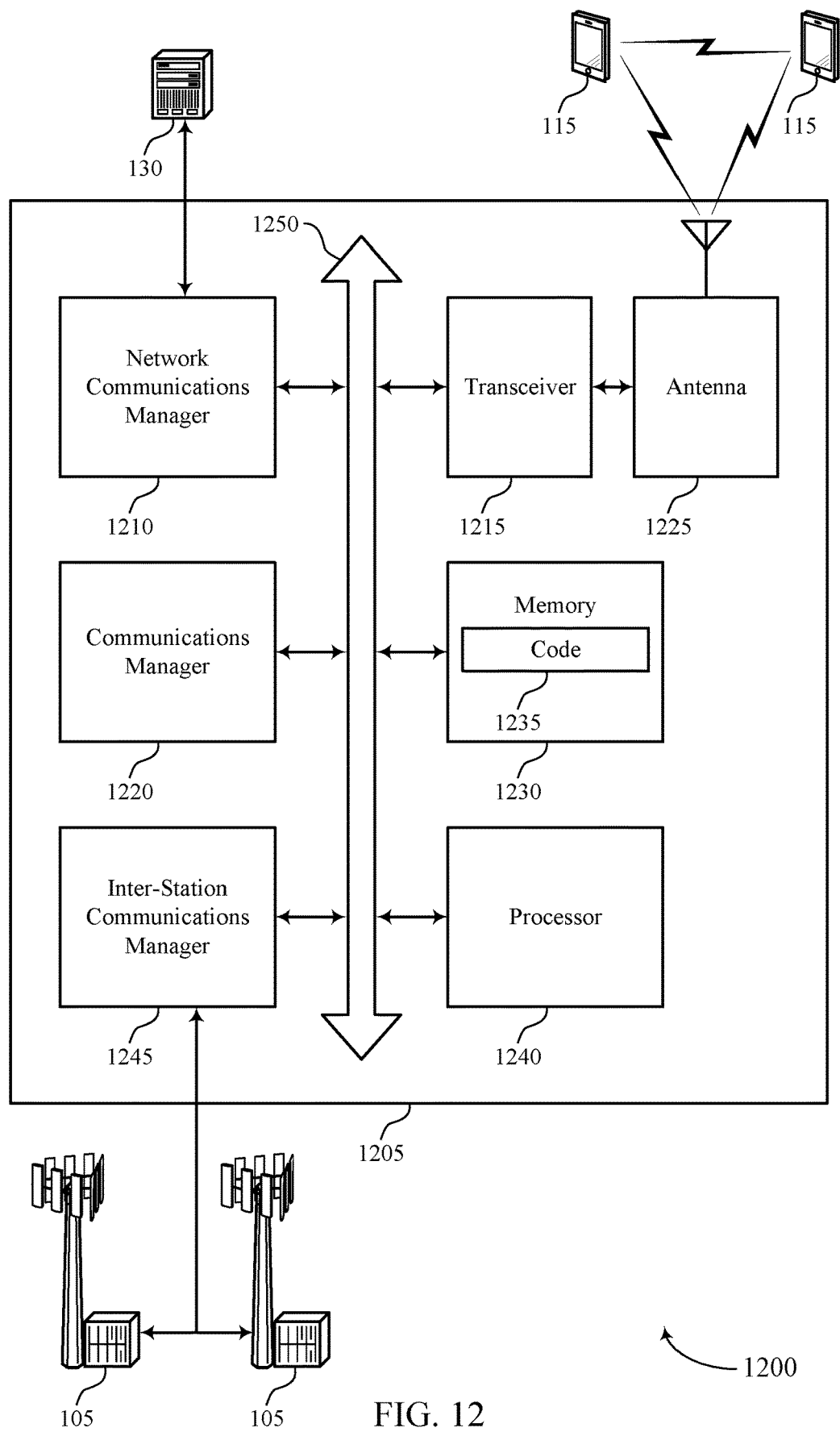
FIG. 12 shows a diagram of a system including a device that supports indications for multicast and unicast transmissions in accordance with aspects of the present disclosure.

FIG. 12 shows a diagram of a system 1200 including a device 1205 that supports indications for multicast and unicast transmissions in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting indications for multicast and unicast transmissions). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting a codepoint configuration for a PTM transmission scheme that indicates a mapping between a set of multiple codepoint indexes, a set of multiple multicast configurations, and a set of multiple unicast configurations. The communications manager 1220 may be configured as or otherwise support a means for transmitting a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations. The communications manager 1220 may be configured as or otherwise support a means for transmitting the shared data channel transmission in accordance with the indicated transmission configuration.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of indications for multicast and unicast transmissions as described herein, or the processor 1240 and the memory 1230 may be otherwise configured to perform or support such operations.

Figure 13:
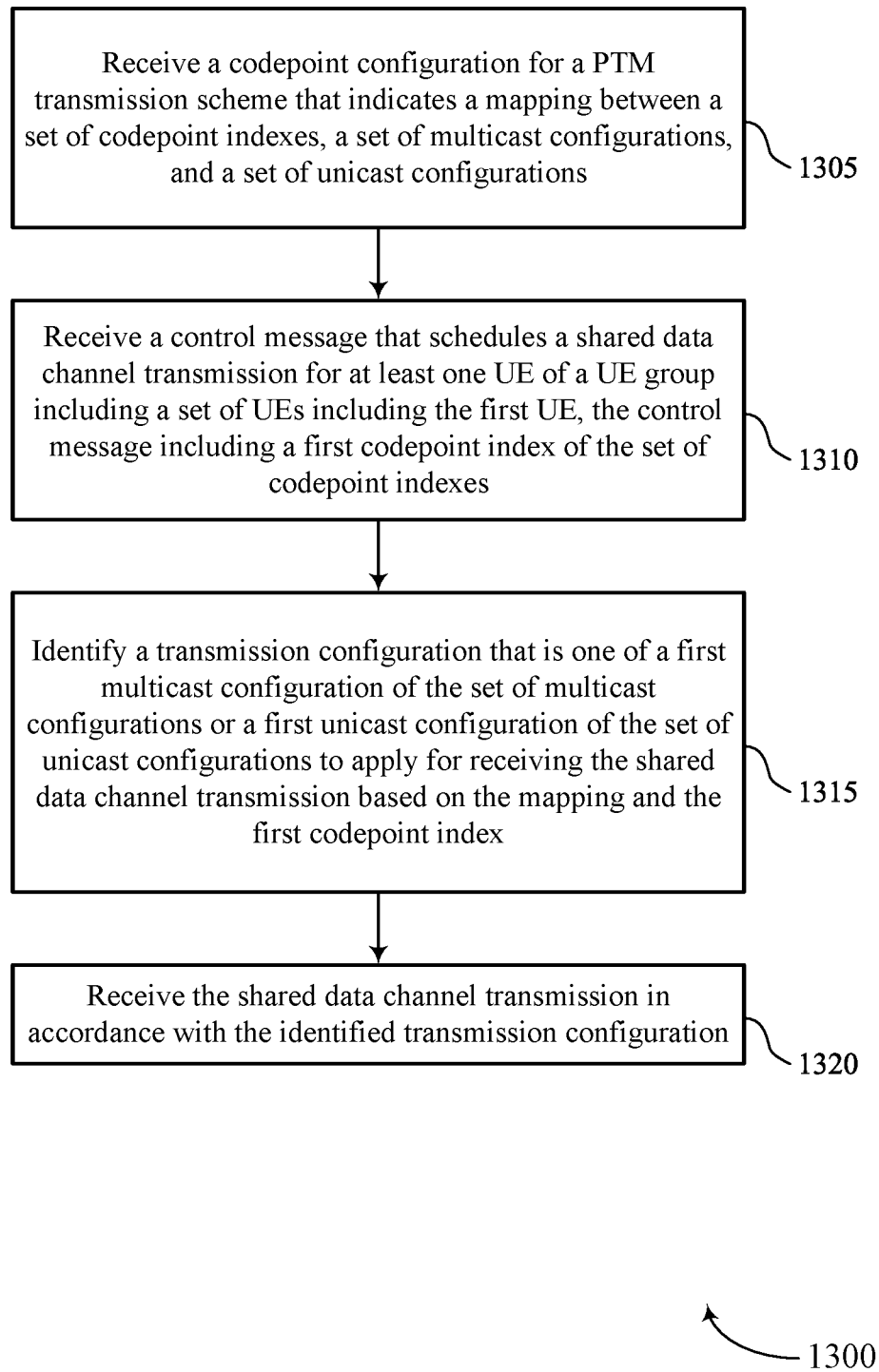
FIGS. 13 through 18 show flowcharts illustrating methods that support indications for multicast and unicast transmissions in accordance with aspects of the present disclosure.

FIG. 13 shows a flowchart illustrating a method 1300 that supports indications for multicast and unicast transmissions in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a codepoint configuration for a PTM transmission scheme that indicates a mapping between a set of multiple codepoint indexes, a set of multiple multicast configurations, and a set of multiple unicast configurations. The operations of 1305 may be performed in accordance with examples as disclosed herein. In some examples, aspects of the operations of 1305 may be performed by a codepoint configuration component 725 as described with reference to FIG. 7.

At 1310, the method may include receiving a control message that schedules a shared data channel transmission for at least one UE of a UE group including a set of multiple UEs including the first UE, the control message including a first codepoint index of the set of multiple codepoint indexes. The operations of 1310 may be performed in accordance with examples as disclosed herein. In some examples, aspects of the operations of 1310 may be performed by a control message reception component 730 as described with reference to FIG. 7.

At 1315, the method may include identifying a transmission configuration that is one of a first multicast configuration of the set of multiple multicast configurations or a first unicast configuration of the set of multiple unicast configurations to apply for receiving the shared data channel transmission based on the mapping and the first codepoint index. The operations of 1315 may be performed in accordance with examples as disclosed herein. In some examples, aspects of the operations of 1315 may be performed by a transmission configuration identifier 735 as described with reference to FIG. 7.

At 1320, the method may include receiving the shared data channel transmission in accordance with the identified transmission configuration. The operations of 1320 may be performed in accordance with examples as disclosed herein. In some examples, aspects of the operations of 1320 may be performed by a shared data channel reception component 740 as described with reference to FIG. 7.

Figure 14:
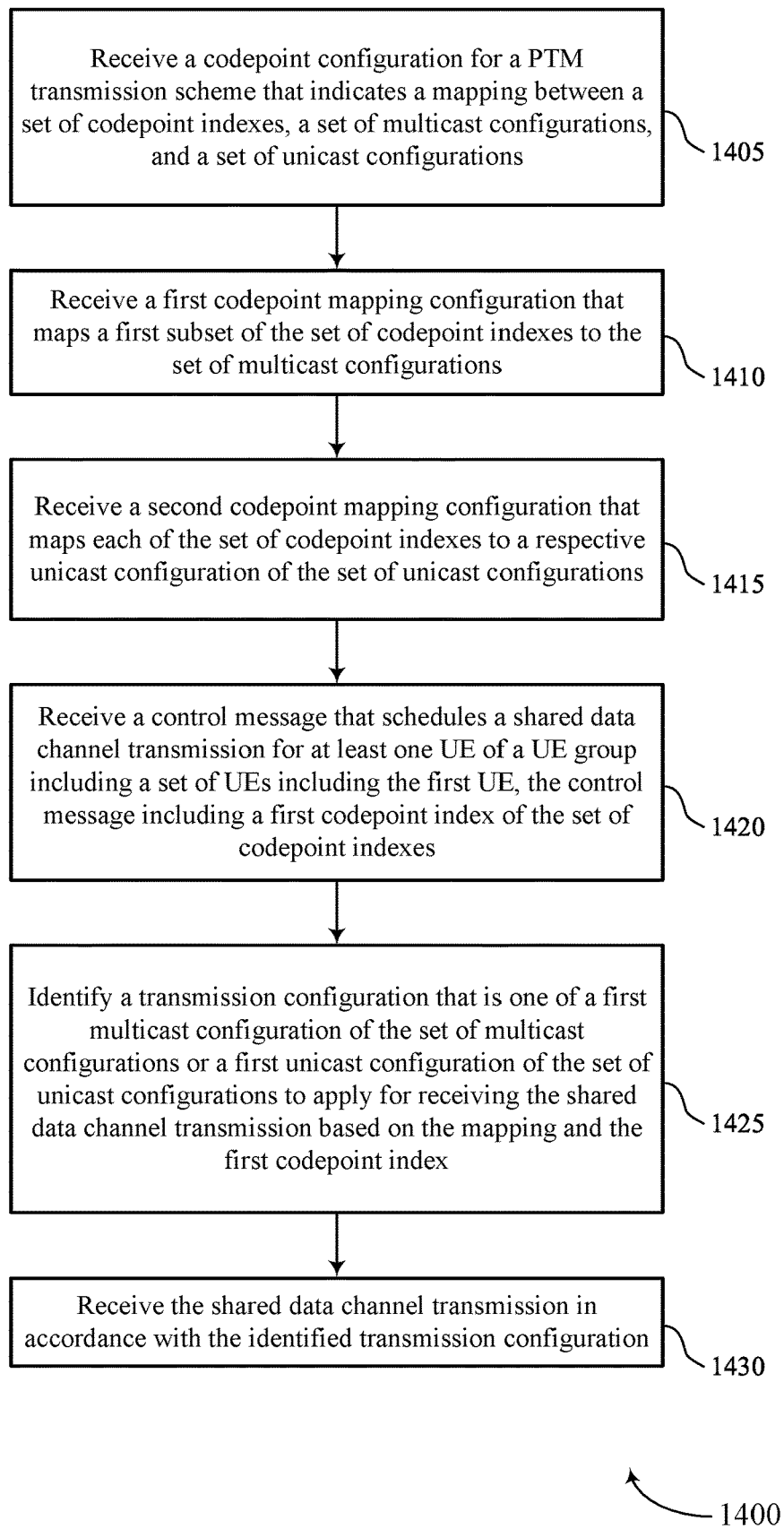

FIG. 14 shows a flowchart illustrating a method 1400 that supports indications for multicast and unicast transmissions in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a codepoint configuration for a PTM transmission scheme that indicates a mapping between a set of multiple codepoint indexes, a set of multiple multicast configurations, and a set of multiple unicast configurations. The operations of 1405 may be performed in accordance with examples as disclosed herein. In some examples, aspects of the operations of 1405 may be performed by a codepoint configuration component 725 as described with reference to FIG. 7.

At 1410, the method may include receiving a first codepoint mapping configuration that maps a first subset of the set of multiple codepoint indexes to the set of multiple multicast configurations. The operations of 1410 may be performed in accordance with examples as disclosed herein. In some examples, aspects of the operations of 1410 may be performed by a codepoint configuration component 725 as described with reference to FIG. 7.

At 1415, the method may include receiving a second codepoint mapping configuration that maps each of the set of multiple codepoint indexes to a respective unicast configuration of the set of multiple unicast configurations. The operations of 1415 may be performed in accordance with examples as disclosed herein. In some examples, aspects of the operations of 1415 may be performed by a codepoint configuration component 725 as described with reference to FIG. 7.

At 1420, the method may include receiving a control message that schedules a shared data channel transmission for at least one UE of a UE group including a set of multiple UEs including the first UE, the control message including a first codepoint index of the set of multiple codepoint indexes. The operations of 1420 may be performed in accordance with examples as disclosed herein. In some examples, aspects of the operations of 1420 may be performed by a control message reception component 730 as described with reference to FIG. 7.

At 1425, the method may include identifying a transmission configuration that is one of a first multicast configuration of the set of multiple multicast configurations or a first unicast configuration of the set of multiple unicast configurations to apply for receiving the shared data channel transmission based on the mapping and the first codepoint index. The operations of 1425 may be performed in accordance with examples as disclosed herein. In some examples, aspects of the operations of 1425 may be performed by a transmission configuration identifier 735 as described with reference to FIG. 7.

At 1430, the method may include receiving the shared data channel transmission in accordance with the identified transmission configuration. The operations of 1430 may be performed in accordance with examples as disclosed herein. In some examples, aspects of the operations of 1430 may be performed by a shared data channel reception component 740 as described with reference to FIG. 7.

Figure 15:
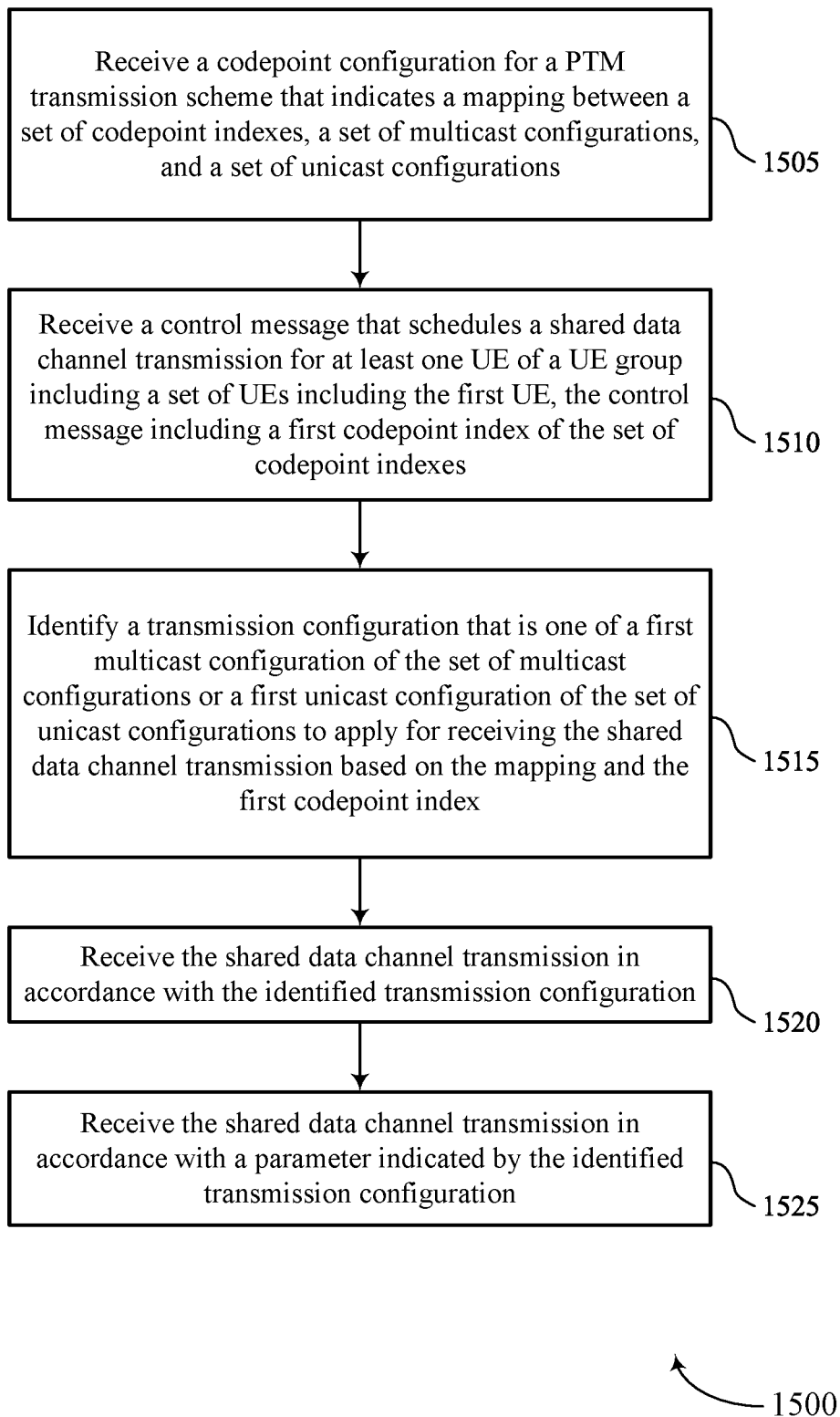

FIG. 15 shows a flowchart illustrating a method 1500 that supports indications for multicast and unicast transmissions in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving a codepoint configuration for a PTM transmission scheme that indicates a mapping between a set of multiple codepoint indexes, a set of multiple multicast configurations, and a set of multiple unicast configurations. The operations of 1505 may be performed in accordance with examples as disclosed herein. In some examples, aspects of the operations of 1505 may be performed by a codepoint configuration component 725 as described with reference to FIG. 7.

At 1510, the method may include receiving a control message that schedules a shared data channel transmission for at least one UE of a UE group including a set of multiple UEs including the first UE, the control message including a first codepoint index of the set of multiple codepoint indexes. The operations of 1510 may be performed in accordance with examples as disclosed herein. In some examples, aspects of the operations of 1510 may be performed by a control message reception component 730 as described with reference to FIG. 7.

At 1515, the method may include identifying a transmission configuration that is one of a first multicast configuration of the set of multiple multicast configurations or a first unicast configuration of the set of multiple unicast configurations to apply for receiving the shared data channel transmission based on the mapping and the first codepoint index. The operations of 1515 may be performed in accordance with examples as disclosed herein. In some examples, aspects of the operations of 1515 may be performed by a transmission configuration identifier 735 as described with reference to FIG. 7.

At 1520, the method may include receiving the shared data channel transmission in accordance with the identified transmission configuration. The operations of 1520 may be performed in accordance with examples as disclosed herein. In some examples, aspects of the operations of 1520 may be performed by a shared data channel reception component 740 as described with reference to FIG. 7.

At 1525, the method may include receiving the shared data channel transmission in accordance with a parameter indicated by the identified transmission configuration. The operations of 1525 may be performed in accordance with examples as disclosed herein. In some examples, aspects of the operations of 1525 may be performed by a shared data channel reception component 740 as described with reference to FIG. 7.

Figure 16:
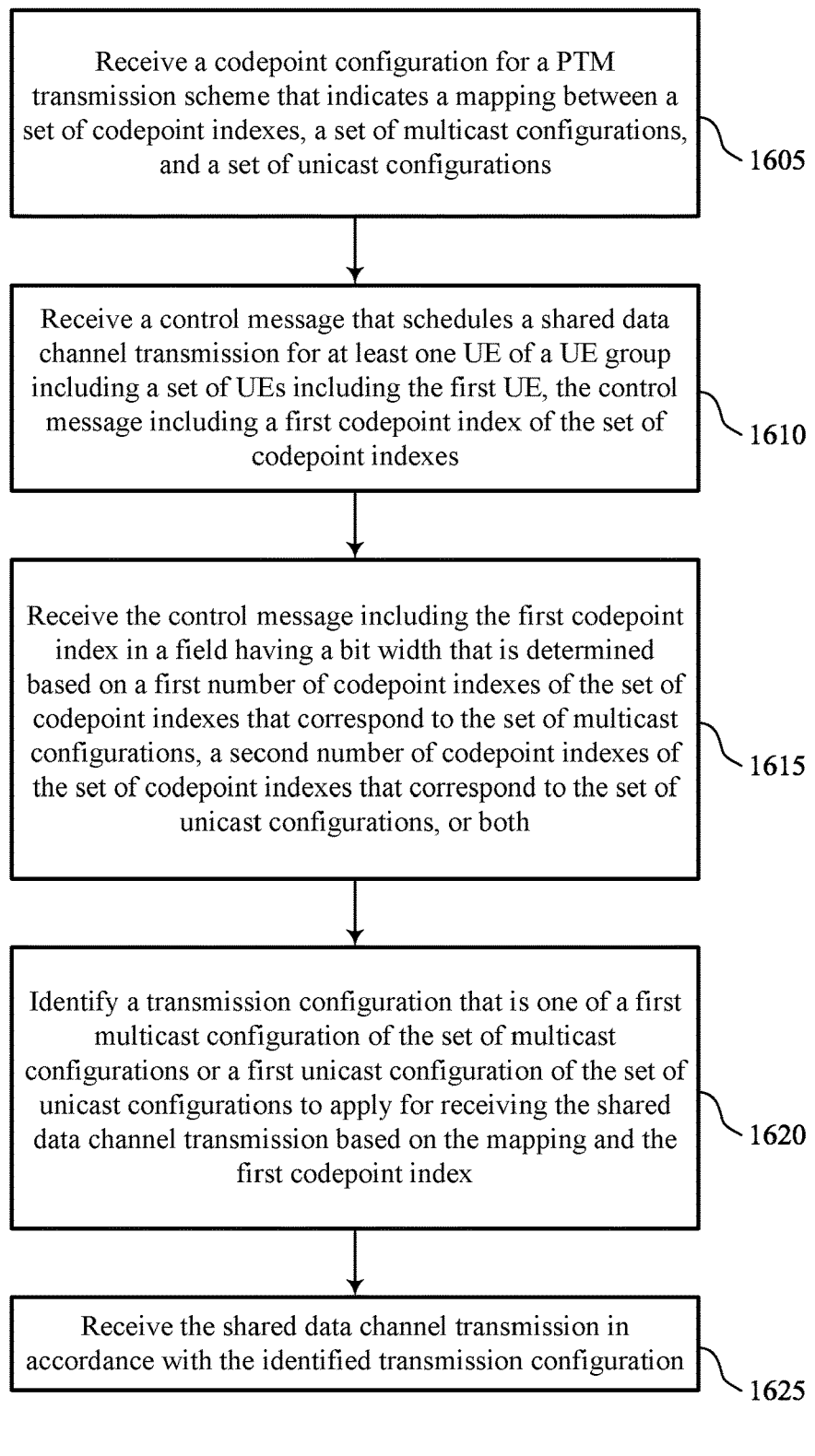

FIG. 16 shows a flowchart illustrating a method 1600 that supports indications for multicast and unicast transmissions in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving a codepoint configuration for a PTM transmission scheme that indicates a mapping between a set of multiple codepoint indexes, a set of multiple multicast configurations, and a set of multiple unicast configurations. The operations of 1605 may be performed in accordance with examples as disclosed herein. In some examples, aspects of the operations of 1605 may be performed by a codepoint configuration component 725 as described with reference to FIG. 7.

At 1610, the method may include receiving a control message that schedules a shared data channel transmission for at least one UE of a UE group including a set of multiple UEs including the first UE, the control message including a first codepoint index of the set of multiple codepoint indexes. The operations of 1610 may be performed in accordance with examples as disclosed herein. In some examples, aspects of the operations of 1610 may be performed by a control message reception component 730 as described with reference to FIG. 7.

At 1615, the method may include receiving the control message including the first codepoint index in a field having a bit width that is determined based on a first number of codepoint indexes of the set of multiple codepoint indexes that correspond to the set of multiple multicast configurations, a second number of codepoint indexes of the set of multiple codepoint indexes that correspond to the set of multiple unicast configurations, or both. The operations of 1615 may be performed in accordance with examples as disclosed herein. In some examples, aspects of the operations of 1615 may be performed by a field size determination component 745 as described with reference to FIG. 7.

At 1620, the method may include identifying a transmission configuration that is one of a first multicast configuration of the set of multiple multicast configurations or a first unicast configuration of the set of multiple unicast configurations to apply for receiving the shared data channel transmission based on the mapping and the first codepoint index. The operations of 1620 may be performed in accordance with examples as disclosed herein. In some examples, aspects of the operations of 1620 may be performed by a transmission configuration identifier 735 as described with reference to FIG. 7.

At 1625, the method may include receiving the shared data channel transmission in accordance with the identified transmission configuration. The operations of 1625 may be performed in accordance with examples as disclosed herein. In some examples, aspects of the operations of 1625 may be performed by a shared data channel reception component 740 as described with reference to FIG. 7.

Figure 17:
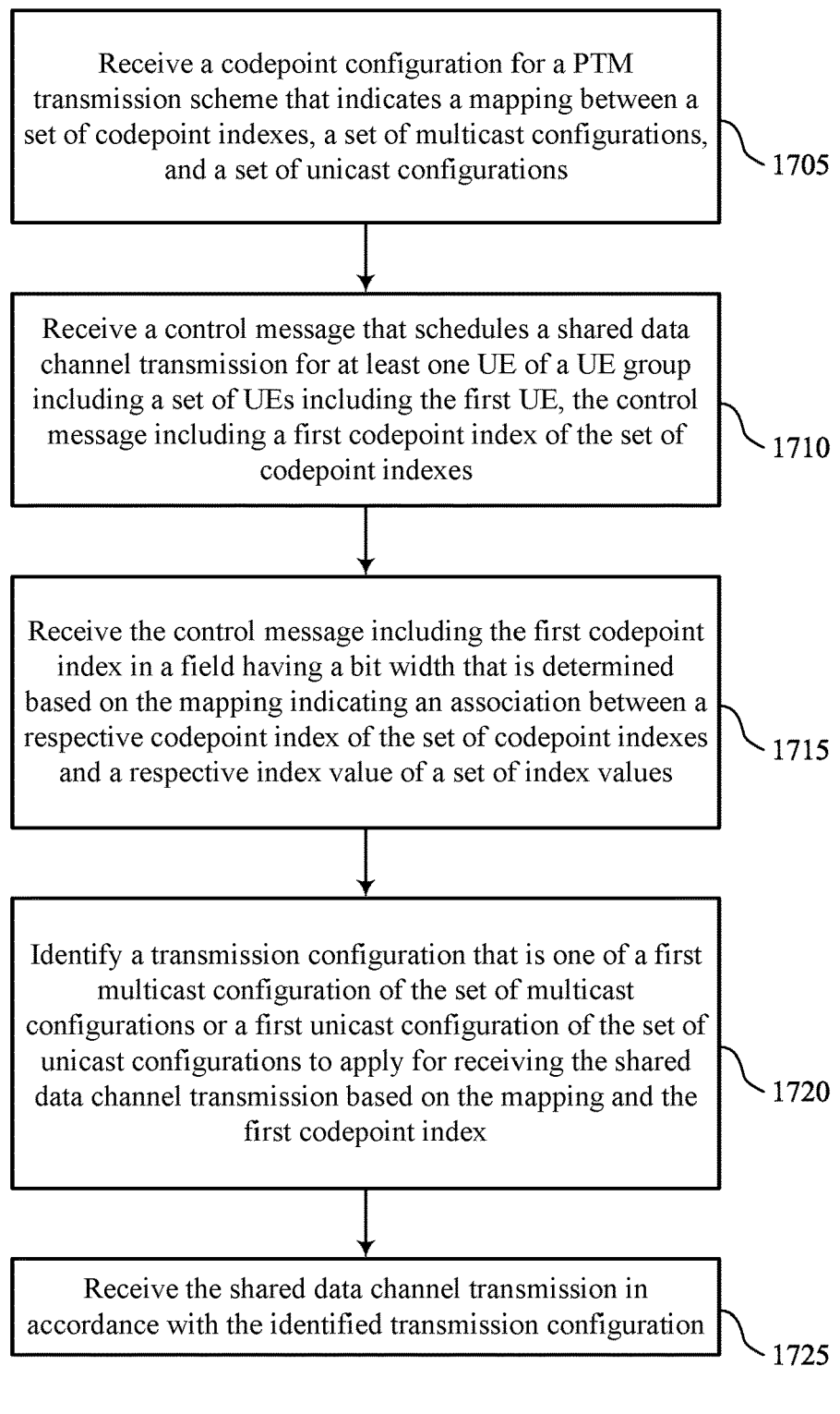

FIG. 17 shows a flowchart illustrating a method 1700 that supports indications for multicast and unicast transmissions in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving a codepoint configuration for a PTM transmission scheme that indicates a mapping between a set of multiple codepoint indexes, a set of multiple multicast configurations, and a set of multiple unicast configurations. The operations of 1705 may be performed in accordance with examples as disclosed herein. In some examples, aspects of the operations of 1705 may be performed by a codepoint configuration component 725 as described with reference to FIG. 7.

At 1710, the method may include receiving a control message that schedules a shared data channel transmission for at least one UE of a UE group including a set of multiple UEs including the first UE, the control message including a first codepoint index of the set of multiple codepoint indexes. The operations of 1710 may be performed in accordance with examples as disclosed herein. In some examples, aspects of the operations of 1710 may be performed by a control message reception component 730 as described with reference to FIG. 7.

At 1715, the method may include receiving the control message including the first codepoint index in a field having a bit width that is determined based on the mapping indicating an association between a respective codepoint index of the set of multiple codepoint indexes and a respective index value of a set of multiple index values. The operations of 1715 may be performed in accordance with examples as disclosed herein. In some examples, aspects of the operations of 1715 may be performed by a field size determination component 745 as described with reference to FIG. 7.

At 1720, the method may include identifying a transmission configuration that is one of a first multicast configuration of the set of multiple multicast configurations or a first unicast configuration of the set of multiple unicast configurations to apply for receiving the shared data channel transmission based on the mapping and the first codepoint index. The operations of 1720 may be performed in accordance with examples as disclosed herein. In some examples, aspects of the operations of 1720 may be performed by a transmission configuration identifier 735 as described with reference to FIG. 7.

At 1725, the method may include receiving the shared data channel transmission in accordance with the identified transmission configuration. The operations of 1725 may be performed in accordance with examples as disclosed herein. In some examples, aspects of the operations of 1725 may be performed by a shared data channel reception component 740 as described with reference to FIG. 7.

Figure 18:
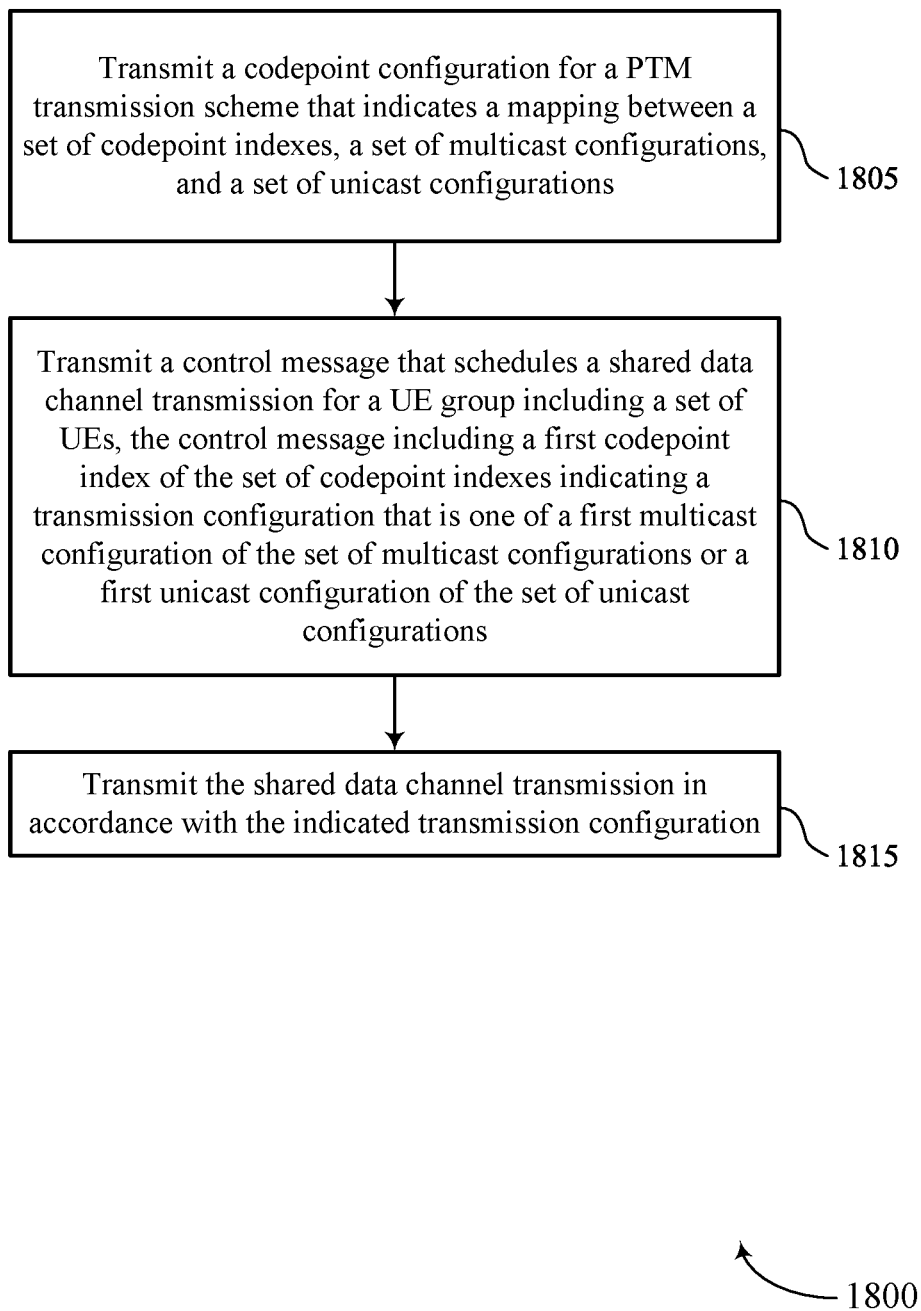

FIG. 18 shows a flowchart illustrating a method 1800 that supports indications for multicast and unicast transmissions in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting a codepoint configuration for a PTM transmission scheme that indicates a mapping between a set of multiple codepoint indexes, a set of multiple multicast configurations, and a set of multiple unicast configurations. The operations of 1805 may be performed in accordance with examples as disclosed herein. In some examples, aspects of the operations of 1805 may be performed by a codepoint configuration transmission component 1125 as described with reference to FIG. 11.

At 1810, the method may include transmitting a control message that schedules a shared data channel transmission for a UE group including a set of multiple UEs, the control message including a first codepoint index of the set of multiple codepoint indexes indicating a transmission configuration that is one of a first multicast configuration of the set of multiple multicast configurations or a first unicast configuration of the set of multiple unicast configurations. The operations of 1810 may be performed in accordance with examples as disclosed herein. In some examples, aspects of the operations of 1810 may be performed by a control message transmission component 1130 as described with reference to FIG. 11.

At 1815, the method may include transmitting the shared data channel transmission in accordance with the indicated transmission configuration. The operations of 1815 may be performed in accordance with examples as disclosed herein. In some examples, aspects of the operations of 1815 may be performed by a shared data channel transmission component 1135 as described with reference to FIG. 11.

The following provides an overview of aspects of the present disclosure:

Aspect 1: A method for wireless communications at a first UE, comprising: receiving a codepoint configuration for a point to multipoint transmission scheme that indicates a mapping between a plurality of codepoint indexes, a plurality of multicast configurations, and a plurality of unicast configurations; receiving a control message that schedules a shared data channel transmission for at least one UE of a UE group comprising a plurality of UEs including the first UE, the control message comprising a first codepoint index of the plurality of codepoint indexes; identifying a transmission configuration that is one of a first multicast configuration of the plurality of multicast configurations or a first unicast configuration of the plurality of unicast configurations to apply for receiving the shared data channel transmission based at least in part on the mapping and the first codepoint index; and receiving the shared data channel transmission in accordance with the identified transmission configuration.

Aspect 2: The method of aspect 1, wherein receiving the codepoint configuration comprises: receiving a first codepoint mapping configuration that maps a first subset of the plurality of codepoint indexes to the plurality of multicast configurations; and receiving a second codepoint mapping configuration that maps each of the plurality of codepoint indexes to a respective unicast configuration of the plurality of unicast configurations.

Aspect 3: The method of aspect 2, wherein identifying the transmission configuration comprises: identifying that the transmission configuration is the first multicast configuration based at least in part on the first codepoint index occurring within the first subset of the plurality of codepoint indexes.

Aspect 4: The method of aspect 2, wherein identifying the transmission configuration further comprises: identifying that the transmission configuration is the first unicast configuration based at least in part on the first codepoint index occurring outside of the first subset of the plurality of codepoint indexes.

Aspect 5: The method of any of aspects 1 through 4, wherein receiving the shared data channel transmission comprises: receiving the shared data channel transmission in accordance with a parameter indicated by the identified transmission configuration.

Aspect 6: The method of aspect 5, wherein the parameter comprises a transmission configuration indicator state, a resource allocation, a modulation and coding scheme, a precoding matrix indicator, or any combination thereof.

Aspect 7: The method of any of aspects 1 through 6, wherein receiving the control message comprises: receiving the control message comprising the first codepoint index in a field having a bit width that is determined based at least in part on a first number of codepoint indexes of the plurality of codepoint indexes that correspond to the plurality of multicast configurations, a second number of codepoint indexes of the plurality of codepoint indexes that correspond to the plurality of unicast configurations, or both.

Aspect 8: The method of any of aspects 1 through 6, wherein receiving the control message comprises: receiving the control message comprising the first codepoint index in a field having a bit width that is determined based at least in part on the mapping indicating an association between a respective codepoint index of the plurality of codepoint indexes and a respective index value of a plurality of index values.

Aspect 9: The method of aspect 8, wherein receiving the codepoint configuration comprises: receiving the codepoint configuration that indicates the association.

Aspect 10: The method of any of aspects 8 through 9, wherein the association is determined based at least in part on an ascending order or a descending order of parameters indicated in the codepoint configuration.

Aspect 11: The method of any of aspects 8 through 9, wherein the association is determined based at least in part on an ascending order or a descending order of identifiers of one or more parameters indicated in the codepoint configuration.

Aspect 12: The method of any of aspects 1 through 11, wherein receiving the codepoint configuration comprises: receiving the codepoint configuration indicating a unicast value corresponding to a second codepoint index value of the plurality of codepoint indexes and a null value corresponding to a third codepoint index value of the plurality of codepoint indexes.

Aspect 13: The method of aspect 12, further comprising: receiving a second control message that schedules a second shared data channel transmission for the UE group; and determining to refrain from receiving the second shared data channel transmission or from transmitting acknowledgment feedback for the second shared data channel transmission based at least in part on a second codepoint index included in the second control message having the third codepoint index value.

Aspect 14: The method of any of aspects 1 through 13, further comprising: receiving an indication of a subgroup of the UE group to which the first UE belongs, wherein the identifying which of the first multicast configuration or the first unicast configuration to apply is based at least in part on the first UE being in the subgroup.

Aspect 15: The method of any of aspects 1 through 14, wherein receiving the control message comprises: receiving a new data indicator field in the control message, wherein the identifying which of the first multicast configuration or the first unicast configuration to apply is based at least in part on a value of the new data indicator field.

Aspect 16: The method of any of aspects 1 through 15, wherein receiving the control message comprises: receiving a group-common control message with a cyclic redundancy check scrambled by a group-common radio network temporary identifier corresponding to the UE group, the group-common control message scheduling a group-common shared data channel transmission that is scrambled with the group-common radio network temporary identifier, wherein the control message comprises the group-common control message and the shared data channel transmission comprises the group-common shared data channel transmission.

Aspect 17: A method for wireless communications at a base station, comprising: transmitting a codepoint configuration for a point to multipoint transmission scheme that indicates a mapping between a plurality of codepoint indexes, a plurality of multicast configurations, and a plurality of unicast configurations; transmitting a control message that schedules a shared data channel transmission for a UE group comprising a plurality of UEs, the control message comprising a first codepoint index of the plurality of codepoint indexes indicating a transmission configuration that is one of a first multicast configuration of the plurality of multicast configurations or a first unicast configuration of the plurality of unicast configurations; and transmitting the shared data channel transmission in accordance with the indicated transmission configuration.

Aspect 18: The method of aspect 17, wherein transmitting the codepoint configuration comprises: transmitting a first codepoint mapping configuration that maps a first subset of the plurality of codepoint indexes to the plurality of multicast configurations; and transmitting a second codepoint mapping configuration that maps each of the plurality of codepoint indexes to a respective unicast configuration of the plurality of unicast configurations.

Aspect 19: The method of aspect 18, wherein transmitting the control message comprises: transmitting the control message comprising the first codepoint index to indicate the transmission configuration is the first multicast configuration based at least in part on the first codepoint index occurring within the first subset of the plurality of codepoint indexes.

Aspect 20: The method of aspect 18, wherein transmitting the control message comprises: transmitting the control message comprising the first codepoint index to indicate the transmission configuration is the first unicast configuration based at least in part on the first codepoint index occurring outside of the first subset of the plurality of codepoint indexes.

Aspect 21: The method of any of aspects 17 through 20, wherein transmitting the shared data channel transmission comprises: transmitting the shared data channel transmission in accordance with a parameter indicated by the transmission configuration.

Aspect 22: The method of aspect 21, wherein the parameter comprises a transmission configuration indicator state, a resource allocation, a modulation and coding scheme, a precoding matrix indicator, or any combination thereof.

Aspect 23: The method of any of aspects 17 through 22, wherein transmitting the control message comprises: transmitting the control message comprising the first codepoint index in a field having a bit width that is determined based at least in part on a first number of codepoint indexes of the plurality of codepoint indexes that correspond to the plurality of multicast configurations, a second number of codepoint indexes of the plurality of codepoint indexes that correspond to the plurality of unicast configurations, or both.

Aspect 24: The method of any of aspects 17 through 22, wherein transmitting the control message comprises: transmitting the control message comprising the first codepoint index in a field having a bit width that is determined based at least in part on the mapping indicating an association between a respective codepoint index of the plurality of codepoint indexes and a respective index value of a plurality of index values.

Aspect 25: The method of aspect 24, wherein transmitting the codepoint configuration comprises: transmitting the codepoint configuration that indicates the association.

Aspect 26: The method of any of aspects 24 through 25, wherein the association is determined based at least in part on an ascending order or a descending order of parameters indicated in the codepoint configuration.

Aspect 27: The method of any of aspects 24 through 25, wherein the association is determined based at least in part on an ascending order or a descending order of identifiers of one or more parameters indicated in the codepoint configuration.

Aspect 28: The method of any of aspects 17 through 27, wherein transmitting the codepoint configuration comprises: transmitting the codepoint configuration indicating a unicast value corresponding to a second codepoint index value of the plurality of codepoint indexes and a null value corresponding to a third codepoint index value of the plurality of codepoint indexes.

Aspect 29: An apparatus for wireless communications at a first UE, comprising a processor; memory coupled with the processor; and instructions stored in the memory and executable by the processor to cause the apparatus to perform a method of any of aspects 1 through 16.

Aspect 30: An apparatus for wireless communications at a first UE, comprising at least one means for performing a method of any of aspects 1 through 16.

Aspect 31: A non-transitory computer-readable medium storing code for wireless communications at a first UE, the code comprising instructions executable by a processor to perform a method of any of aspects 1 through 16.

Aspect 32: An apparatus for wireless communications at a base station, comprising a processor; memory coupled with the processor; and instructions stored in the memory and executable by the processor to cause the apparatus to perform a method of any of aspects 17 through 28.

Aspect 33: An apparatus for wireless communications at a base station, comprising at least one means for performing a method of any of aspects 17 through 28.

Aspect 34: A non-transitory computer-readable medium storing code for wireless communications at a base station, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:

receiving a codepoint configuration for a point to multipoint transmission scheme that indicates a mapping between a plurality of codepoint indexes, a plurality of multicast configurations, and a plurality of unicast configurations, wherein the mapping indicates at least one codepoint index of the plurality of codepoint indexes is associated with both of one of the plurality of multicast configurations and one of the plurality of unicast configurations;

receiving a control message that schedules a shared data channel transmission for at least one UE of a UE group comprising a plurality of UEs including the first UE, the control message comprising a first codepoint index of the plurality of codepoint indexes;

identifying a transmission configuration that is one of a first multicast configuration of the plurality of multicast configurations or a first unicast configuration of the plurality of unicast configurations to apply for receiving the shared data channel transmission based at least in part on the mapping and the first codepoint index; and receiving the shared data channel transmission in accordance with the identified transmission configuration.

2. The method of claim 1, wherein receiving the codepoint configuration comprises:
receiving a first codepoint mapping configuration that maps a first subset of the plurality of codepoint indexes to the plurality of multicast configurations; and
receiving a second codepoint mapping configuration that maps each of the plurality of codepoint indexes to a respective unicast configuration of the plurality of unicast configurations.

3. The method of claim 2, wherein identifying the transmission configuration comprises:
identifying that the transmission configuration is the first multicast configuration based at least in part on the first codepoint index occurring within the first subset of the plurality of codepoint indexes.

4. The method of claim 2, wherein identifying the transmission configuration further comprises:
identifying that the transmission configuration is the first unicast configuration based at least in part on the first codepoint index occurring outside of the first subset of the plurality of codepoint indexes.

5. The method of claim 1, wherein receiving the shared data channel transmission comprises:
receiving the shared data channel transmission in accordance with a parameter indicated by the identified transmission configuration.

6. The method of claim 5, wherein the parameter comprises a transmission configuration indicator state, a resource allocation, a modulation and coding scheme, a precoding matrix indicator, or any combination thereof.

7. The method of claim 1, wherein receiving the control message comprises:
receiving the control message comprising the first codepoint index in a field having a bit width that is determined based at least in part on a first number of codepoint indexes of the plurality of codepoint indexes that correspond to the plurality of multicast configurations, a second number of codepoint indexes of the plurality of codepoint indexes that correspond to the plurality of unicast configurations, or both.

8. The method of claim 1, wherein receiving the control message comprises:
receiving the control message comprising the first codepoint index in a field having a bit width that is determined based at least in part on the mapping indicating an association between a respective codepoint index of the plurality of codepoint indexes and a respective index value of a plurality of index values.

9. The method of claim 8, wherein receiving the codepoint configuration comprises:
receiving the codepoint configuration that indicates the association.

10. The method of claim 8, wherein the association is determined based at least in part on an ascending order or a descending order of parameters indicated in the codepoint configuration.

11. The method of claim 8, wherein the association is determined based at least in part on an ascending order or a descending order of identifiers of one or more parameters indicated in the codepoint configuration.

12. The method of claim 1, wherein receiving the codepoint configuration comprises:
receiving the codepoint configuration indicating a unicast value corresponding to a second codepoint index value of the plurality of codepoint indexes and a null value corresponding to a third codepoint index value of the plurality of codepoint indexes.

13. The method of claim 12, further comprising:
receiving a second control message that schedules a second shared data channel transmission for the UE group; and
determining to refrain from receiving the second shared data channel transmission or from transmitting acknowledgment feedback for the second shared data channel transmission based at least in part on a second codepoint index included in the second control message having the third codepoint index value.

14. The method of claim 1, further comprising:
receiving an indication of a subgroup of the UE group to which the first UE belongs, wherein the identifying which of the first multicast configuration or the first unicast configuration to apply is based at least in part on the first UE being in the subgroup.

15. The method of claim 1, wherein receiving the control message comprises:
receiving a new data indicator field in downlink control information of the control message, wherein the identifying which of the first multicast configuration or the first unicast configuration to apply is based at least in part on a value of the new data indicator field.

16. The method of claim 1, wherein receiving the control message comprises:
receiving a group-common control message with a cyclic redundancy check scrambled by a group-common radio network temporary identifier corresponding to the UE group, the group-common control message scheduling a group-common shared data channel transmission that is scrambled with the group-common radio network temporary identifier, wherein the control message comprises the group-common control message and the shared data channel transmission comprises the group-common shared data channel transmission.

17. A method for wireless communications at a network entity, comprising:
transmitting a codepoint configuration for a point to multipoint transmission scheme that indicates a mapping between a plurality of codepoint indexes, a plurality of multicast configurations, and a plurality of unicast configurations, wherein the mapping indicates at least one codepoint index of the plurality of codepoint indexes is associated with both of one of the plurality of multicast configurations and one of the plurality of unicast configurations;
transmitting a control message that schedules a shared data channel transmission for a UE group comprising a plurality of UEs, the control message comprising a first codepoint index of the plurality of codepoint indexes indicating a transmission configuration that is one of a first multicast configuration of the plurality of multicast configurations or a first unicast configuration of the plurality of unicast configurations; and transmitting the shared data channel transmission in accordance with the indicated transmission configuration.

18. The method of claim 17, wherein transmitting the codepoint configuration comprises:
transmitting a first codepoint mapping configuration that maps a first subset of the plurality of codepoint indexes to the plurality of multicast configurations; and
transmitting a second codepoint mapping configuration that maps each of the plurality of codepoint indexes to a respective unicast configuration of the plurality of unicast configurations.

19. The method of claim 18, wherein transmitting the control message comprises:
transmitting the control message comprising the first codepoint index to indicate the transmission configuration is the first multicast configuration based at least in part on the first codepoint index occurring within the first subset of the plurality of codepoint indexes.

20. The method of claim 18, wherein transmitting the control message comprises:
transmitting the control message comprising the first codepoint index to indicate the transmission configuration is the first unicast configuration based at least in part on the first codepoint index occurring outside of the first subset of the plurality of codepoint indexes.

21. The method of claim 17, wherein transmitting the shared data channel transmission comprises:
transmitting the shared data channel transmission in accordance with a parameter indicated by the transmission configuration.

22. The method of claim 21, wherein the parameter comprises a transmission configuration indicator state, a resource allocation, a modulation and coding scheme, a precoding matrix indicator, or any combination thereof.

23. The method of claim 17, wherein transmitting the control message comprises:
transmitting the control message comprising the first codepoint index in a field having a bit width that is determined based at least in part on a first number of codepoint indexes of the plurality of codepoint indexes that correspond to the plurality of multicast configurations, a second number of codepoint indexes of the plurality of codepoint indexes that correspond to the plurality of unicast configurations, or both.

24. The method of claim 17, wherein transmitting the control message comprises:
transmitting the control message comprising the first codepoint index in a field having a bit width that is determined based at least in part on the mapping indicating an association between a respective codepoint index of the plurality of codepoint indexes and a respective index value of a plurality of index values.

25. The method of claim 24, wherein transmitting the codepoint configuration comprises:
transmitting the codepoint configuration that indicates the association.

26. The method of claim 24, wherein the association is determined based at least in part on an ascending order or a descending order of parameters indicated in the codepoint configuration.

27. The method of claim 24, wherein the association is determined based at least in part on an ascending order or a descending order of identifiers of one or more parameters indicated in the codepoint configuration.

28. The method of claim 17, wherein transmitting the codepoint configuration comprises:
transmitting the codepoint configuration indicating a unicast value corresponding to a second codepoint index value of the plurality of codepoint indexes and a null value corresponding to a third codepoint index value of the plurality of codepoint indexes.

29. An apparatus for wireless communications at a first user equipment (UE), comprising:
a processor; and
a memory coupled with the processor, with instructions stored in the memory and executable by the processor to cause the apparatus to:
receive a codepoint configuration for a point to multipoint transmission scheme that indicates a mapping between a plurality of codepoint indexes, a plurality of multicast configurations, and a plurality of unicast configurations, wherein the mapping indicates at least one codepoint index of the plurality of codepoint indexes is associated with both of one of the plurality of multicast configurations and one of the plurality of unicast configurations;
receive a control message that schedules a shared data channel transmission for at least one UE of a UE group comprising a plurality of UEs including the first UE, the control message comprising a first codepoint index of the plurality of codepoint indexes;
identify a transmission configuration that is one of a first multicast configuration of the plurality of multicast configurations or a first unicast configuration of the plurality of unicast configurations to apply for receiving the shared data channel transmission based at least in part on the mapping and the first codepoint index; and
receive the shared data channel transmission in accordance with the identified transmission configuration.

30. An apparatus for wireless communications at a network entity, comprising:
a processor; and
a memory coupled with the processor, with instructions stored in the memory and executable by the processor to cause the apparatus to:
transmit a codepoint configuration for a point to multipoint transmission scheme that indicates a mapping between a plurality of codepoint indexes, a plurality of multicast configurations, and a plurality of unicast configurations, wherein the mapping indicates at least one codepoint index of the plurality of codepoint indexes is associated with both of one of the plurality of multicast configurations and one of the plurality of unicast configurations;
transmit a control message that schedules a shared data channel transmission for a UE group comprising a plurality of UEs, the control message comprising a first codepoint index of the plurality of codepoint indexes indicating a transmission configuration that is one of a first multicast configuration of the plurality of multicast configurations or a first unicast configuration of the plurality of unicast configurations; and
transmit the shared data channel transmission in accordance with the indicated transmission configuration.

* * * * *